United States Patent [19]

Suzuki et al.

[11] Patent Number: 4,974,175
[45] Date of Patent: Nov. 27, 1990

[54] DRAWING INFORMATION PROCESSING METHOD AND APPARATUS

[75] Inventors: Goro Suzuki, Hitachi; Nobuhiro Hamada, Hitachiota, both of Japan

[73] Assignee: Hitachi, Ltd., Tokyo, Japan

[21] Appl. No.: 208,115

[22] Filed: Jun. 17, 1988

[30] Foreign Application Priority Data

Jun. 19, 1987 [JP] Japan ............... 62-151174
Jun. 22, 1987 [JP] Japan ............... 62-153413
Nov. 17, 1987 [JP] Japan ............... 62-288412

[51] Int. Cl.$^5$ ..................... G06F 15/626
[52] U.S. Cl. ................. 364/522; 364/518; 364/521; 364/491; 340/750
[58] Field of Search ........ 364/521, 518, 490, 491, 364/522; 357/41, 42, 54; 437/51; 340/747, 750

[56] References Cited

U.S. PATENT DOCUMENTS

| | | | |
|---|---|---|---|
| 4,608,653 | 8/1986 | Setoguchi | 364/522 |
| 4,636,965 | 1/1987 | Smith et al. | 364/491 |
| 4,688,072 | 8/1987 | Heath et al. | 357/45 |
| 4,710,876 | 12/1987 | Cline et al. | 364/414 |
| 4,719,585 | 1/1988 | Cline et al. | 364/518 |
| 4,737,916 | 4/1988 | Ogawa et al. | 364/443 |
| 4,744,047 | 10/1988 | Okamoto et al. | 364/900 |
| 4,805,113 | 2/1989 | Ishii et al. | 364/491 |
| 4,847,788 | 7/1989 | Shimada | 364/522 |

Primary Examiner—Gary V. Harkcom
Assistant Examiner—Phu K. Nguyen
Attorney, Agent, or Firm—Antonelli, Terry, Stout & Kraus

[57] ABSTRACT

An apparatus and method for processing information of a drawing comprises steps of defining figure data representing figures, respectively, included in a drawing, preparing a plurality of regions called as field block memory regions for storing the figure data so that they can be selectively read out for edition of a drawing later on, and determining a usable range in each of the field block memories in accordance with the number of the figures included in the drawing. In a preferred mode, the method further includes steps of dividing the drawing into congruent rectangles called as buckets in a number determined in accordance with the number of the figures included in the drawing, allocating the abovementioned field block memory regions to the buckets, respectively, and storing the figure data in the memory region allocated to the bucket to which the associated figure belongs.

18 Claims, 18 Drawing Sheets

FIG. 1
PRIOR ART
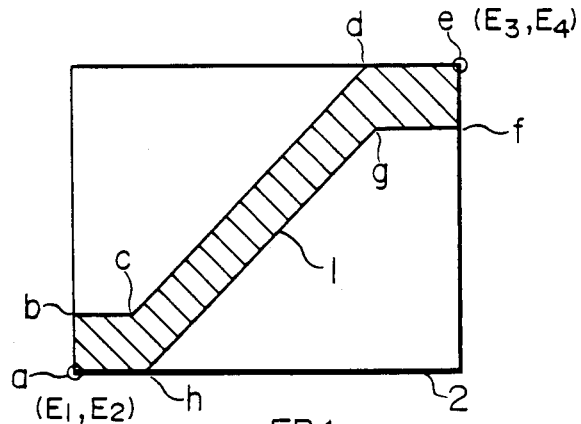
FIG. 2
PRIOR ART
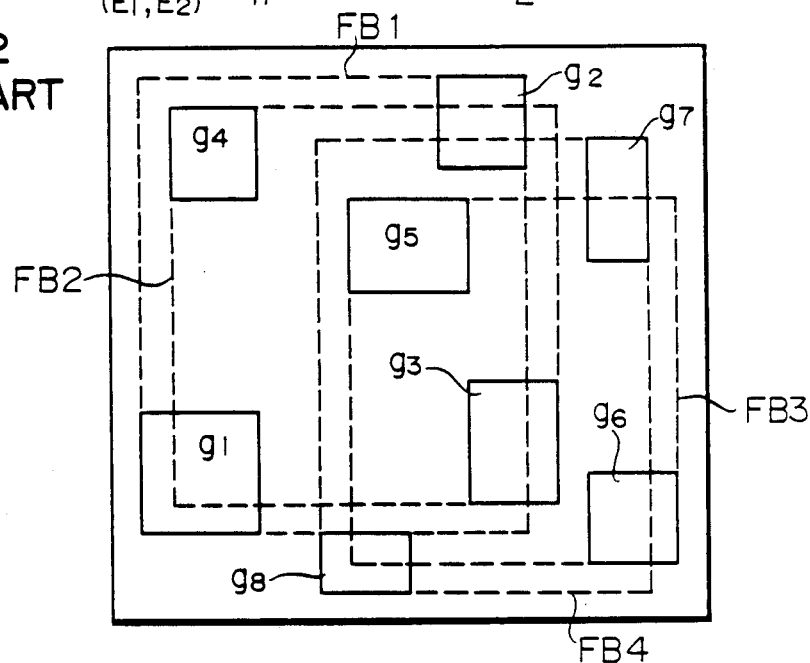
FIG. 3A        FIG. 3B
PRIOR ART

| $g_1$ | $g_2$ | $g_3$ | $g_4$ | FB 1 |
| --- | --- | --- | --- | --- |
| $g_5$ | $g_6$ | $g_7$ | $g_8$ | FB 2 |
| $g_9$ | $g_{10}$ | $g_{11}$ | $g_{12}$ | FB 3 |

FIG. 19

| | | | | | |
|---|---|---|---|---|---|
| B 1 | g1 | g12 | | | FB 1 |
| B 2 | | | | | |
| B 3 | | | | | |
| B 4 | g9 | g6 | | | FB 2 |
| B 5 | g5 | g10 | | | FB 3 |
| B 6 | | | | | |
| B 7 | g3 | g11 | 14 | | FB 4 |
| B 8 | | | | | |
| B 9 | | | | | |
| B 10 | g4 | g7 | | | FB 5 |
| B 11 | | | | | |
| B 12 | g2 | | | | FB 6 |
| B 13 | | | | | |
| B 14 | | | | | |
| B 15 | g8 | g13 | | | FB 7 |
| B 16 | | | | | |

| MB 1 | FB1 | FB3 |  |  | MFB 1 |
| MB 2 | FB2 | FB4 |  |  | MFB 2 |
| MB 3 | FB5 |  |  |  | MFB 3 |
| MB 4 | FB6 | FB7 |  |  | MFB 4 |

MACRO BUCKET FOR MACRO FIELD BLOCK

BUCKEY FOR FIELD BLOCK

DRAWING INFORMATION PROCESSING METHOD AND APPARATUS

BACKGROUND OF THE INVENTION

The present invention generally relates to a method of processing information or data of a drawing and an apparatus for carrying out the same. More particularly, the invention is concerned with a method and an apparatus for extracting at a high speed a set of figures viewed in a designated rectangular region (referred to as a window) from a drawing of large scale such as a logic circuit design drawing and a mask pattern drawing for a very large scale integrated circuit (VLSI) and others, for thereby allowing the extracted figure data to be used for the edition of drawings later on.

As the techniques for extracting at a high speed a set or group of figures viewed in a designated window, there have heretofore been known a field block method and a bucket division method such as those described, for example, in Japanese patent unexamined publications, JP-A-60-163169, JP-A-61-150073, JP-A-61-241873, JP-A-62-80766, Japanese patent examined publication JP-61-26713 and T. Asano et al "Computational Geometry Algorithms" North-Holland, Advances in CAD for VLSI, Volume 4 (1986), pp. 307–308.

According to the field block method disclosed in JP-A-61-241873, a plurality of field block memory regions each of a predetermined fixed size are previously prepared, wherein figure data indicating given figures are sequentially stored at first in a first field block memory region. When the first field block memory region becomes full of the figure data, the succeeding figure data are then sequentially stored in a second field block memory region. When the second region is filled up, the storage of the figure data is then performed for the succeeding field block memory region. In this way, similar storage process is repeatedly carried out.

By way of example, reference is to be made to FIG. 1 of the accompanying drawings. The figure data of a FIG. 1 indicated by a hatched area contains position data of a rectangle 2 which can cover or encompass this FIG. 1 with a minimum area (which rectangle is referred to as a figure covering rectangle), and shape data concerning the shape or profile of the FIG. 1. The position data of the figure covering rectangle 2 are given in terms of the coordinates (E1, E2) of a bottom leftmost point a of that rectangle and the coordinate (E3, E4) of a top rightmost point e thereof, while the shape data includes the coordinates of individual discontinuity points or inflection points a, b, c, d, e, f, g and h as well as other data concerning the shape of the FIG. 1. Accordingly, of the figure data for given figures, the amount of the shape data may differ from one to another figure in dependence on the shapes or geometries thereof, even when the position data can remain constant. Suppose, for example, a drawing illustrating thereon a plurality of figures covered by rectangles g1 to g8, respectively, as is shown in FIG. 2 of the accompanying drawings. These rectangles g1 to g8 are to be stored in this order in the field block memory regions FB1 to FB4 in such a manner as shown in FIG. 3A. In that case, the figure data of the figure covering rectangles g1 and g2 are stored in the field block memory region FB1, the figure data of the figure covering rectangles g3 and g4 are stored in the field block memory region FB2, the figure data of the figure covering rectangles g5 and g6 are stored in the field block memory region FB3, and finally the figure data of the figure covering rectangles g7 and g8 are stored in the field block memory region FB4. Since the amount of the shape data contained in the figure data may differ in dependence on the shape or geometry of the figure encompassed by the figure covering rectangle, as described above, the individual field block memory regions can not always store the figure data for a same number of the figure covering rectangles as in the case of the abovementioned example. In other words, the number of the figure covering rectangles whose figure data are stored in given ones of the field block memory regions can not be constant. Besides, the number of the field block memory regions to be used will vary in dependence on the scale of the drawing to be processed, i.e. the total number of the figures illustrated on the drawing and the shapes of the individual figures.

Further, for storing information or data for managing the field block memory regions, there is provided a managing memory having memory regions allocated in correspondence to the field block memory regions, respectively, as is shown in FIG. 3B. In this case, a rectangle capable of covering with a minimum area all the figure covering rectangles which stored in a given field block memory region is referred to as a field block, wherein the position data indicating the position of the field block, e.g. the coordinates of the bottom leftmost and the top rightmost points of the field block are stored in the region of the managing memory which corresponds to that given one field block memory region. In the case of the example shown in FIG. 2, the field block memory region including the figure covering rectangles g1 and g2 constitutes a field block indicated by a broken-line rectangle FB1. The field blocks FB2, FB3 and FB4 are defined in similar manner. FIG. 4 shows only the field blocks extracted from the illustration shown in FIG. 2. The position data of the field block FB1, by way of example, are given in terms of the coordinates P1, P2 of the bottom leftmost point of that block and the coordinates P3, P4 of the top rightmost point thereof and stored in the region of the managing memory corresponding to the field block memory region FB1. Similarly, the position data of the field blocks FB2, FB3 and FB4 are stored in the corresponding regions of the managing memory, respectively, as shown in FIG. 3B.

Next, referring to FIG. 5, description will be made of a procedure for extracting those figures which is viewed in or overlaps with a designated window such as, for example, a window 9 from a number of figures stored in a number of the field block memory regions. It should however be understood that for the sake of simplification of the description, the number and the positions of the figure covering rectangles and the field blocks shown in FIG. 5 bear no relation to those illustrated in FIG. 4. Now, referring to FIG. 5, the figure viewed in the window 9 is extracted through the procedure steps mentioned below. Step 1: The position data of the given window 9 represented by the coordinates (W1, W2) of the bottom leftmost point and the coordinates (W3, W4) of the top rightmost point are compared with the position data of the individual field blocks stored in the managing memory, whereby all the field blocks overlapping with the window 9 are extracted. In the case of the example illustrated in FIG. 5, one field block 5 is extracted. Step 2: The position data of the figure covering rectangles included in each of the extracted field blocks are read out from the associated field block memory regions to be compared with the position data of the abovementioned window 9, to thereby extract all the figure covering rectangles overlapping with the window 9. In the case of the example shown in FIG. 5, only the figure covering rectangle g2 is extracted from the rectangles (g1, g2 and g3) that are included in the field block 5. Step 3: The shape data of the figure included in the extracted figure covering rectangle g2 is compared with the position data of the window to thereby extract the figure included in the window.

Next, consideration will be paid to the time involved in executing the calculations for extracting the figure covering rectangle viewed in the designated window.

It is assumed that N represents the number of the field blocks, n represents the number of all the figures included in a drawing, m represents the number of the field blocks overlapping with the window, $T_1^2$ represents the time involved in the calculation for extracting the field blocks overlapping with window, $T_2^2$ represents the time involved in calculation for extracting the figure covering rectangle overlapping with the window from each of the extracted field block, and $T^2$ represents the time in total involved in all the calculations. Then, $T_1^2$ and $T_2^2$ can be given by the following expressions (1) and (2):

$$T_1^2 = N t_o \quad (1)$$

$$T_2^2 = m \frac{n}{N} t_o \quad (2)$$

on the assumption that each of the field block memory regions stores a same number (n/N) of the figures. The processing for extracting the field block overlapping with the window and the processing for extracting the figure covering rectangle overlapping with the window are both executed by repeating the step of checking whether two rectangles overlap each other. In this connection, $t_o$ appearing in the above expressions (1) and (2) represents the time required for the processing of this one step.

From the expressions (1) and (2), $$T^2 = \left( N + m \frac{n}{N} \right) t_o \quad (3)$$

On the condition that scale of the drawing to be processed, i.e. n is constant, there exists such value of N which can minimize the time $T^2$. In this conjunction, n/N may be regarded to represent the size of the field block memory. Thus, it can be said that there exists the size of the field block memory which is optimal for minimizing the time $T^2$. According to the field block method known heretofore, however, the size of the field block memory region is fixed independent of the scale of the drawing to be processed as described hereinbefore. Consequently, there can not always be obtained the minimum time (i.e. maximum processing speed) for extracting the figure associated with the window, although it depends on the scale of the drawings.

Generally speaking, however, the figure extraction based on the field block method is still advantageous in that only a small amount of information is sufficient for the managing purpose, and that when the figure is altered, it is sufficient to alter the managing information only for such field block whose region including the figure of concern needs to be correspondingly altered, whereby the procedure for updating the managing information can be extremely simplified.

Now, description will be turned to the bucket division method. According to this method, a drawing is previously divided into a plurality of rectangular regions each of a same size referred to as the buckets, as is shown in FIG. 6 of the accompanying drawings, wherein the figures existing within the buckets are stored in a managing table on the bucket basis. In the example shown in FIG. 6, the drawing is divided into four buckets B1, B2, B3 and B4, and the regions in the managing table stored in a memory are correspondingly allocated to the buckets, respectively, as is shown in FIG. 7A. More specifically, the region B1 of the managing table memory stores the figure data of the figure covering rectangles g1 and g8 which are at least partially included in the bucket B1, while the region B2 stores therein the figure data of the figure covering rectangle g4 and g5 included at least partially in the bucket B2. Further, the region B3 of the managing table memory stores the figure data of the figure covering rectangles g3 and g6 included at least partially in the bucket B3. The region B4 stores the figure data of figure covering rectangles g2, g7 and g5 included at least partially in the bucket B4.

For extracting the figures overlapping with a designated window from the figure data stored in the managing table in the manner mentioned above, the bucket overlapping with the window is first extracted, being then followed by extraction of the figure covering rectangle viewed in the window from those included in each of the extracted buckets. Thereafter, the desired figure is determined from the extracted figure covering rectangle.

The bucket division method outlined above requires significant alternation or modification of the contents of the managing table, when the figure is to be moved or migrated. By way of example, in case the figure covering rectangle g3 is migrated from a solid line position to a dotted line position, as illustrated in FIG. 6, the figure covering rectangles included in the buckets B1, B2 and B4 are changed. As the consequence, it is necessary to alter correspondingly the contents in the regions of the managing table which are allocated to the buckets B1, B2 and B3, as shown in FIG. 7B. Nevertheless of the shortcoming of the bucket division method mentioned above, this method is yet advantageous in that extraction of the figures overlapping with the window can be performed with high efficiency by virtue of the capability of classifying the figures located close to one another in a group on the bucket basis.

SUMMARY OF THE INVENTION

It is a first object of the present invention to provide a method of processing information of a drawing in which the advantageous features of the field block method described above are made use of advantageously and in which the size of the individual field block memory regions can be determined as a function of the number of figures contained in a drawing to be processed for thereby allowing the figures overlapping with a designated window to be extracted with improved efficiency. It is also envisaged with the invention to provide an apparatus for carrying out the method.

A second object of the present invention is to provide a drawing editing method in which advantageous features of the field block method and the bucket division method described above are made use of advantageously with shortcomings of both methods being mutually cancelled out and in which a drawing including a number of figures is divided into a plurality of buckets according to the bucket dividing method with figure data of the figures included in each bucket being managed according to the field block method, wherein the size of the individual field block memory regions used in conjunction with the field block method can be determined in dependence on the number of the figure included in the drawing to be processed. It is also contemplated with the invention to provide an apparatus for carrying out this method.

According to a first aspect of the present invention, the first object mentioned above can be accomplished by providing a method of processing information of a drawing and an apparatus for carrying out the same, which method includes steps of defining figure data representative of a number of figures included in a drawing, respectively; preparing a plurality of regions referred to as the field block memories for storing the abovementioned figure data so that they can be selectively read out later on for edition of a drawing, and determining a permissible range for use of the individual field block memory in dependence on the number of the figures included in the drawings.

According to another aspect of the invention, the second object mentioned above can be accomplished by providing a method of processing information of a drawing and an apparatus for carrying out the same, which method includes steps of defining figure data indicating a number of figures included in the drawing, respectively, dividing the abovementioned drawing into a number of congruent rectangular regions referred to as buckets in accordance with the number of the figures included in the drawing, making each of the individual figures belong to any one of the abovementioned buckets in accordance with preestablished rules, preparing at least one region referred to as a field block memory region in association with each of the buckets for storing the figure data of the figure belonging to the associated bucket so that the figure data can be read out later on for edition of a drawing, and determining a permissible range for use of the field block memory region in dependence on the number of the figures included in the drawing.

BRIEF DESCRIPTION OF THE DRAWINGS

FIGS. 1, 2, 3A, 3B, 4 and 5 are views for illustrating the basic concept of the drawing information processing according to a field block method known heretofore;

FIGS. 18 to 22, 23A and 23B are views for illustrating the basic concept underlying a third embodiment of the present invention;

DESCRIPTION OF THE PREFERRED EMBODIMENTS

Figure 4:
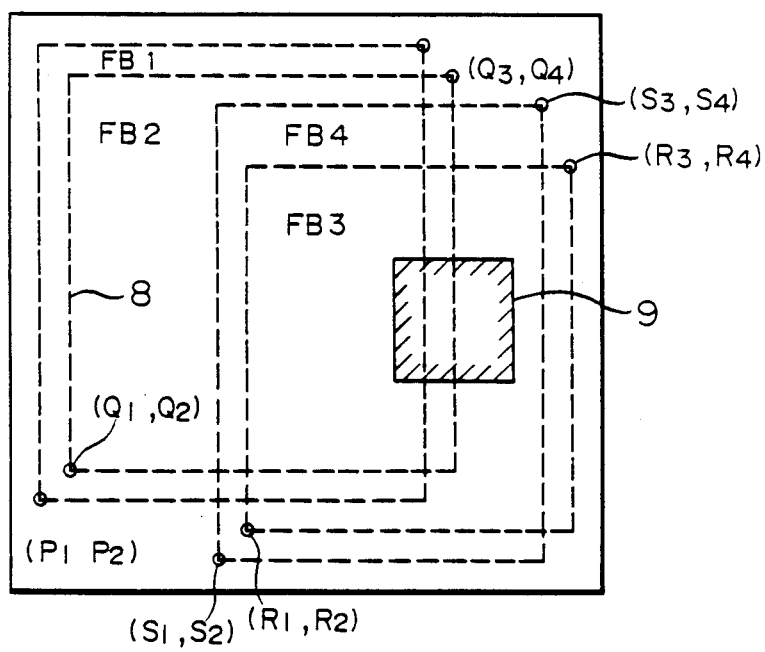
Figure 5:
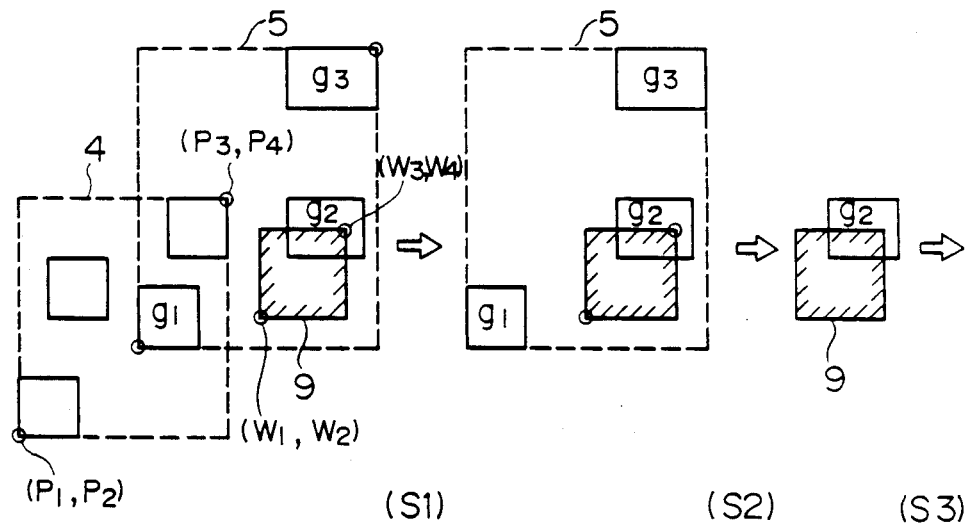
Figures 6, 7A, 7B:
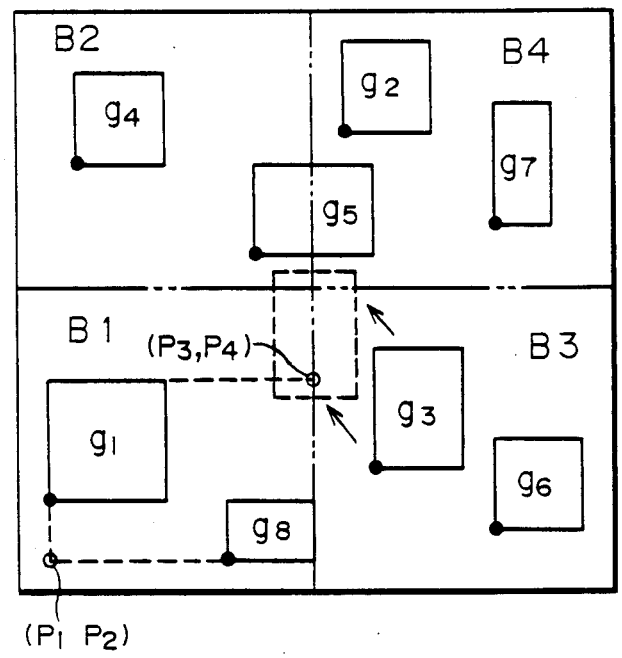
FIGS. 6, 7A and 7B are views for illustrating the basic concept of the drawing information processing according to a bucket division method known heretofore.

When the field block method is used, the time involved in the arithmetic processing for extracting the figure overlapping with a given window is determined in accordance with the expression (3) mentioned hereinbefore. Minimization of this processing time can be accomplished when the following condition is met. Namely, $$\frac{n}{N} = m^{-1/2} \cdot n^{1/2} \qquad (4)$$

It will be understood that the size of the field block memory region may be determined as a function of $n^{\frac{1}{2}}$ and m, since n/N indicates the size of the field block memory region. However, when the drawings of large scale have to be handled, difficulty or impossibility will be encountered in storing all the field block memory regions in a main storage so as to be constantly available. In such case, a so-called swapping processing between the main storage and an auxiliary storage is required in which the field block memory regions are ordinarily stored in the auxiliary storage such as a hard disk or the like and transferred to the main storage as occasion requires. Under the circumstance, it is preferred that the size of the field block memory region which constitutes a unit for the swapping is defined to be constant independent of the scales of the drawings, while an upper limit of a range of the field block memory region permissible to be used is determined as a function of $n^{\frac{1}{2}}$ and m in accordance with the scale of the drawing to be handled, i.e. the number of the figures included in the drawing of concern.

The expression (3) mentioned hereinbefore applies to a two-stage drawing processing method according to which the individual figures are represented by respective figure covering rectangles, and one or more figure covering rectangles each having data capable of being stored in one field block memory region are then combined together to define one field block. In this conjunction, it is to be noted that the number of processing stages can be increased as the scale of the drawing increases. By way of example, a three-stage processing method will be explained below by reference to FIGS. 8, 9A, 9B, 10A and 10B.

Figure 8:
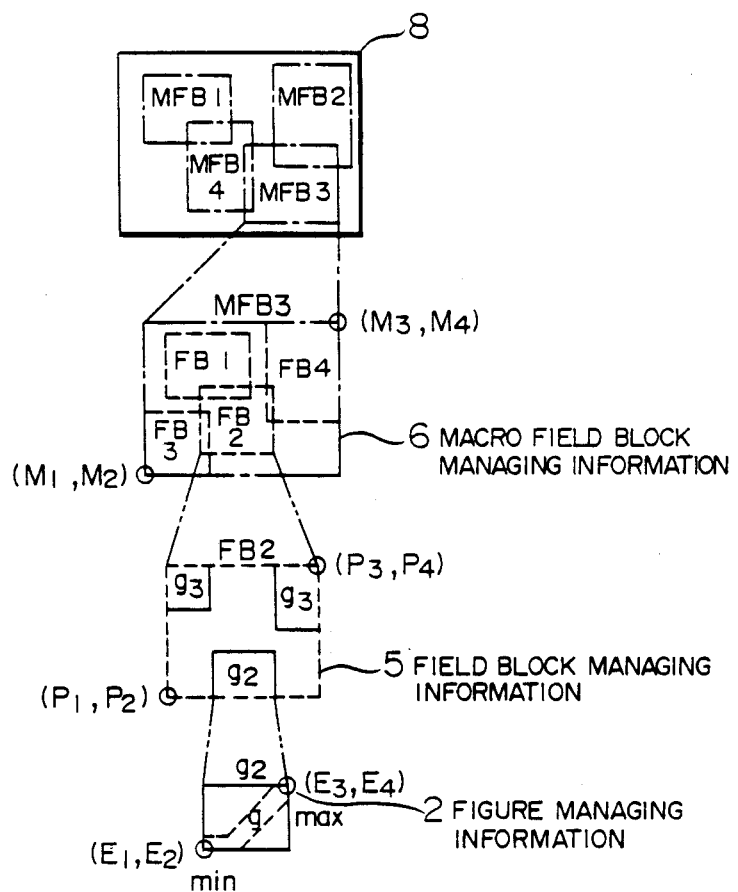
FIG. 8 is a view for illustrating the basic concept of a three-stage processing method for processing information of a drawing according to a first embodiment of the present invention.

Now referring to FIG. 8, a reference numeral 2 denotes a figure covering rectangle covering or encompassing a FIG. 1, as described hereinbefore in conjunction with FIG. 1, wherein the position data of the FIG. 1 are given in terms of the bottom leftmost coordinates (E1, E2) and the top rightmost coordinates (E3, E4) of the figure covering rectangle 2. The figure data of the figure covering rectangles $g_1$, $g_2$ and $g_3$ for a corresponding number of figures are sequentially stored in the field block memory region of a fixed size, as illustrated in FIG. 9A. When the permissible range of use determined in the manner mentioned above is filled up with the data as stored, the figure data of a succeeding figure covering rectangle is stored in a succeeding field block memory region. The figure data for one figure contains the position data given by the bottom leftmost coordinates and the top rightmost coordinates of the associated figure covering rectangle and the shape data G including the coordinates of individual discontinuation or inflection points of the figure, as explained hereinbefore. Further, a rectangular region covering or encompassing the figure covering rectangles corresponding to the figure data stored in one field block memory region defines one field block. In the case of the illustrative example shown in FIG. 8, the three figure covering rectangles $g_1$, $g_2$ and $g_3$ defines one field block 5, wherein the associated figure data are stored in one field block memory region FB1, as is shown in FIG. 9A. The position data of the field block 5 is given by the bottom leftmost coordinates (P1, P2) of that block 5 and the top rightmost coordinates (P3, P4) thereof and stored in a region of a managing memory corresponding to the field block memory region FB1 as the managing information for the field block memory region FB1, as will be seen in FIG. 9B. In the three-stage processing, the concept of a macro field block which contains a plurality of the field blocks is adopted. More specifically, the macro field block memory regions each of a fixed size are prepared, wherein the position data of the field blocks are sequentially stored in a given one of the macro field block memory regions until it has become full of the stored position data. One macro field block is defined by the field blocks corresponding to the position data stored in one macro field block memory region. In the case of the example shown in FIG. 8, the position data of four field blocks FB1, FB2, FB3 and FB4 are stored in one macro field block memory region MFB1, as is shown in FIG. 10A. Thus, these four field blocks defined one macro field block 6. The position data of the macro field block 6 are given by the bottom leftmost coordinates (M1, M2) thereof and the top rightmost coordinates (M3, M4) and stored in a corresponding region of the memory as the managing information for the associated macro field block memory region, as shown in FIG. 10B. In the case of the example shown in FIG. 8, the whole drawing 8 is managed by using four macro field blocks.

Now, discussion will be directed to the time involved in the calculation for extracting a figure covering rectangle g overlapping with a designated window in the three-stage managing processing method described above. Using the following mnemonic representations:

M: number of macro field blocks, $m_2$: mean value of the number of macro field blocks overlapping with a designated window, N: number of field blocks, $m_1$: mean value of the number of field blocks overlapping with a window in each extracted macro field block, and n: number of all figures (i.e. number of all the figure covering rectangles), it is assumed that all the field blocks each include a same number (n/N) of the figure covering rectangles and that all the macro field blocks each include a same number (N/M) of the field blocks. As already elucidated, since the processing for extracting the macro field block MFB, the field block FB and the figure covering rectangle g overlapping with the respective windows is realized as repetition of the step of checking whether two rectangles overlap or not. When the time required by the processing of one step is represented by $t_o$, a total extraction time (i.e. the time in total required for all the extraction processings) $T^3$ is given by $$T^3 = \left( M + m_2 \frac{N}{M} + m_1 \frac{n}{N} \right) t_o \qquad (5)$$

The values of M and N which allow the extraction time to be minimized on the condition that the number of all the figures is constant are, respectively, determined by $$M = (m_2 \cdot m_1 \cdot n)^{\frac{1}{3}} \qquad (6)$$

$$N = (m_2^{-1} \cdot m_1^2 \cdot n^2)^{1/3} \qquad (7)$$

Accordingly, $$\frac{N}{M} = (m_2^{-2} \cdot m_1 \cdot n)^{1/3} \qquad (8)$$

$$\frac{n}{N} = (m_2 \cdot m_1^{-2} \cdot n)^{1/3} \qquad (9)$$

Since N/M and n/N can be regarded as the size of the macro field block memory region and that of the field block memory region, respectively, it will be understood that in the case of the three-stage processing, the size of the field block memory region and that of the macro field block memory region may be determined as a function of $n^{-\frac{1}{3}}$, $m_1$ and $m_2$. However, in consideration of the aforementioned swapping processing, it is preferred to prepare the field block memory regions and the macro field block memory regions with respective same sufficiently large sizes and to establish the upper limits for the respective permissible ranges of use as a function of $n^{\frac{1}{3}}$, $m_1$ and $m_2$. In general, in the case of k-stage processing, the size of the field block memory region or the upper limit of the permissible range for use at each stage may be determined as a function of $n^{1/k}$, $m_1$ and $m_2, \ldots, m_{k-1}$, where $m_1, m_2, \ldots, m_{k-1}$ represent the number of field blocks overlapping with the window in the individual processing stages, respectively, and may assume respective values of "1", "2" or "3" in the ordinary drawing processing. In the actual calculation, the values of $m_1, m_2, \ldots, m_{k-1}$ may be empirically determined by taking into account the shape of the whole drawing, layout and sizes of the windows. In the case of the most typical example where all of these values are "1", the size of all the field block memory region or the upper limit of the permissible range for use is given by $n^{1/k}$. Unless $n^{1/k}$ is a positive integer, the fraction smaller than "1" are rounded up to "1". The size of the memory region or the upper limit of the permissible range for use is expressed in terms of the number of units, wherein one unit is defined as the size required for storing the data of one figure covering rectangle or that of one field block. However, the actual size of the memory region is determined by calculation based on the amount of data for one figure or for one field block and the number of units mentioned above It has been mentioned that the field block memory region 1 and the macro field block memory region 21 are previously prepared in the sufficiently large fixed sizes, respectively, which sizes are however delimited by the maximum scale of the drawing to be handled. Taking as an example a design for a VLSI package, a major proportion of mask pattern drawings for cells each constituting a minimum unit in the design are of scales corresponding to 40 to 50 transistors. There exist however drawings of such scale which corresponds to a hundred thousand of transistors with an extremely small ratio. In this case, the sizes of the individual memory regions are determined by the drawing of the scale corresponding to one hundred thousand transistors notwithstanding of the extremely low frequency of appearance in the processing, which means that a large memory area rarely used must be always reserved on the main storage to wastefulness. To solve this problem, the size of the field block memory section 1 may be fixed on the basis of the scale of the drawing making appearance at the highest frequency in the processing.

Now, representing the number of all the figures by n, the times $Ta^2$ and $Tb^2$ required for extracting the figure covering rectangles overlapping with a designated window will be determined by calculation for the supposed two cases where the size of the field block memory region in the two-stage processing is set to the optimal value $n^{\frac{1}{2}}$ on one hand and set to a value $cn^{\frac{1}{2}}$ resulting from multiplication of the optimal value with c on the other hand.

In the case where the size of the field block memory region is $n^{\frac{1}{2}}$, the number of the field blocks is given by $n^{\frac{1}{2}}$. Then, the time Ta is given by the following expression:

$$Ta = t_o(n^{\frac{1}{2}} + n^{\frac{1}{2}}) = 2t_o \cdot n^{\frac{1}{2}}$$

where $t_o$ represents the time required for executing one step of checking whether one field block or one figure covering rectangle overlaps the window or not.

On the other hand, in the case where the size of the field block memory region is set to $c \cdot n^{\frac{1}{2}}$, the number of the field blocks is given by $n^{\frac{1}{2}}/c$. Accordingly, Tb is given by the following expression:

$$\begin{aligned} Tb &= t_o(n^{1/2}/c + c \cdot n^{1/2}) \\ &= t_o\left(\frac{1+c^2}{c} \cdot n^{1/2}\right) \end{aligned}$$

Thus, it will be seen that when $0 < c < 1$ or $c > 1$, $$\frac{Tb^2}{Ta^2} = \frac{1+c^2}{2c} > 1$$

Further, on the condition that the size of the field block memory and that of the macro field block memory are controlled optimally, comparison of the times $T^2$ and $T^3$ required for performing the abovementioned processing with the two-stage and three-stage managements, respectively, shows:

$$T^2 = 2n^{1/2} \cdot t_o,$$

$$T^3 = 3n^{1/3} \cdot t_o, \text{ and hence}$$

$$\frac{T^2}{T^3} = \frac{2}{3} n^{1/16} > 1$$

It is thus apparent that the effectiveness of the threestage processing becomes more significant as the scale of the drawing to be handled increases. In other words, it is preferred that the number k of the stages in the processing should be selected large.

Next, assuming the case in which the field block memory region capable of dealing with the drawing of the scale corresponding to one hundred thousand transistors is assured and the case where the size of the field block memory region is determined to be commeasurable to the drawing of the scale corresponding to 40 to 50 transistors, comparison will be made as to the memory capacities $M_1$ and $M_2$ required on the main storage for processing the drawings of both scales mentioned above. In this conjunction, it is further assumed that the number of the figures is six times as great as that of the transistors, each figure requiring the memory capacity of 200 B, wherein only the field block memory region required for storing the drawing of the scale corresponding to 40 to 50 transistors is available on the main storage. On these presumed conditions, $M_1 = 760$ KB, and $M_2 = 60$ KB.

It will thus be apparent that the memory capacity can be reduced by a factor of 1/10 when the field block memory size is determined in conformance with the drawing of the scale corresponding to 40 to 50 transistors.

Figure 11:
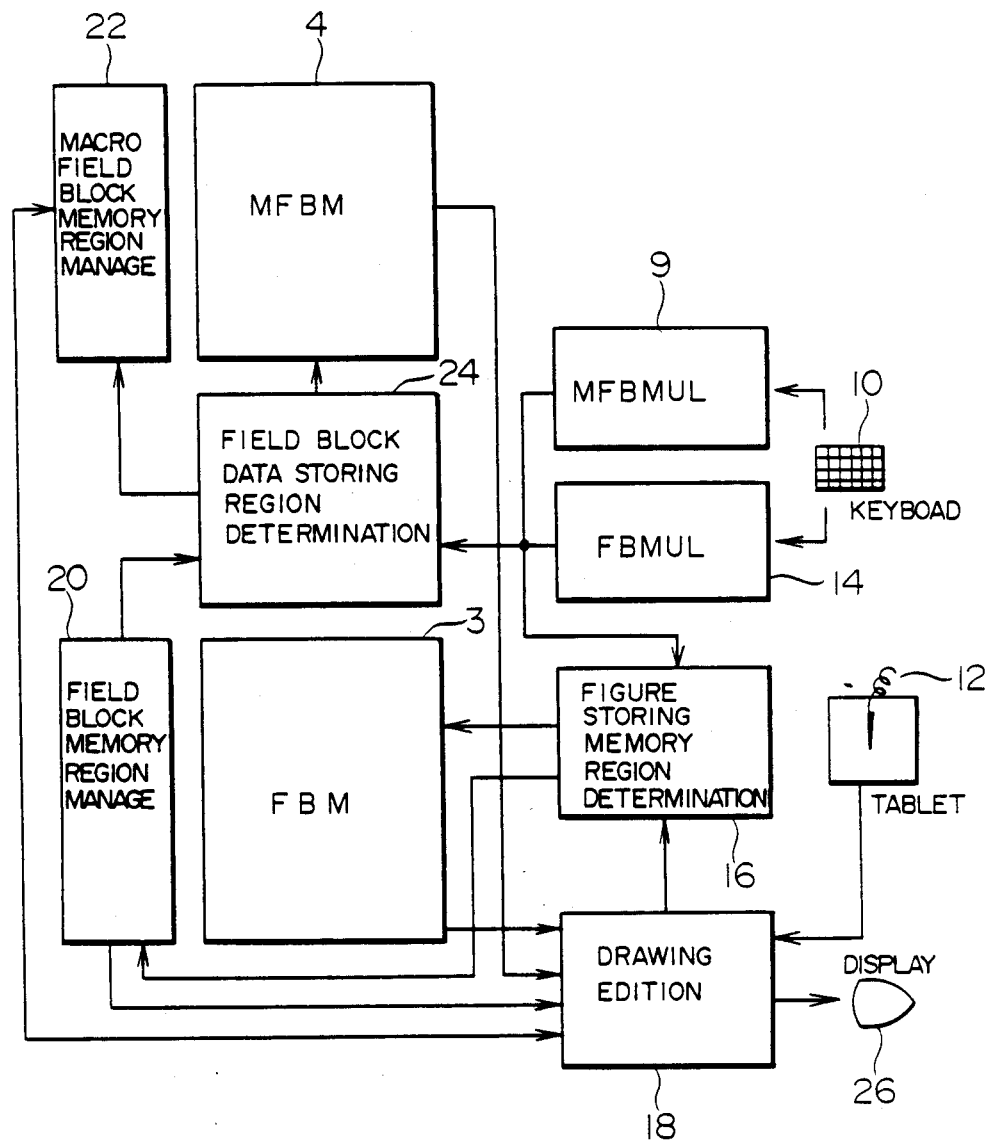
FIG. 11 is a view showing an arrangement of a drawing information processing apparatus according to a first embodiment of the present invention.

Next, an arrangement of the drawing information processing apparatus destined for the three-stage processing will be described by reference to FIG. 11 which shows functionally the drawing information processing apparatus according to a first embodiment of the present invention, being understood that in actual application a computer is used together with a program selected in accordance with the processing as desired, wherein operations or functions of the apparatus are controlled under the selected program. The following description of the functions of the apparatus is based on the assumption that a program for loading the drawing information is used for storing the figure data of various figures inputted externally of the apparatus. Parenthetically, such program per se is known. Now, referring to FIG. 11, the information concerning the scale of a given drawing and the value of $m_1, \ldots, m_{k-1}$ determined empirically are inputted through a keyboard 10, whereupon a field block memory region usable range limit determining unit (hereinafter also referred to simply as FBMUL) 13 and a macro field block memory region usable range limit determining unit (also referred to as MFBMUL in abbreviation) 14 determine the upper limits of the usable range of the associated memory regions each of a fixed size prepared previously in a field block memory (also referred to as FBM) 3 and a macro field block memory (also referred to as MFBM) 4 in accordance with the aforementioned expressions (8) and (9), respectively, the results of the determination being supplied to a figure storage memory region determining unit 16 and a field block data storing macro field block memory region determining unit 24, respectively. The drawing information inputted through the keyboard 10 contains the number n of all the figures included in the drawing and mean data amount indicating one figure. On the other hand, the figure data of the individual figures are sequentially inputted by a tablet 12 to a drawing editing unit 18 through manual operation. The figure data contains the coordinate data of the individual discontinuous points (or inflection points) of the figure, as is illustrated in FIG. 1. The drawing editing unit 18 determines on the basis of the received figure data the position data of the associated figure covering rectangle, i.e. the bottom leftmost coordinates and the top rightmost coordinate of that rectangle, the position data thus determined being sent to the figure storing memory region determining unit 16 together with the figure data. The figure storing memory region determining unit 16 determines the region of the FMB where the figure data mentioned above is to be stored, whereupon the figure data is stored in the memory region as determined in the manner illustrated in FIG. 9A. More specifically, the determination by the figure storing memory region determining unit 16 is made in such a manner in which the field block memory regions are designated in the order of the addresses assigned thereto while the figure data are stored in the designated field block memory regions in the sequence in which the figure data are inputted from the tablet 12. In case new figure data can not be stored in the designated field block memory region within the permissible range, a field block memory region of a succeeding address is designated to allow the new figure data to be stored in the newly designated field block memory region.

Figure 9B:
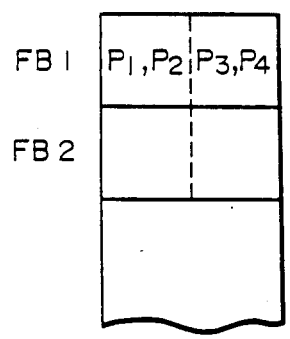
FIGS. 9A, 9B, 10A and 10B are views for illustrating data stored in a field block memory region and an associated managing region as well as data stored in a macro field block memory region and an associated managing region in the three-stage processing.
Figure 9A:
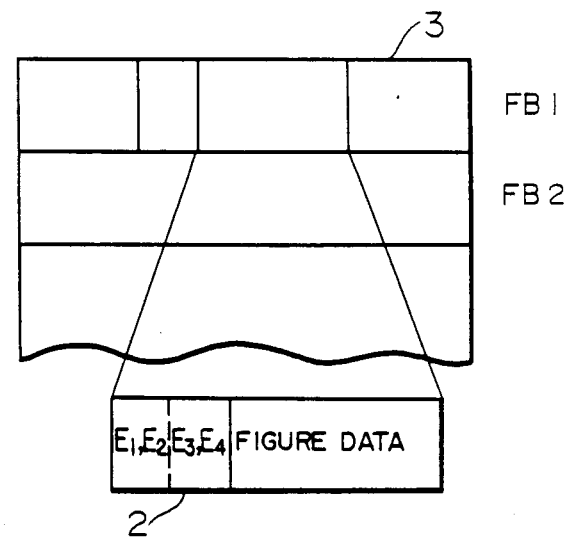
Figure 10B:
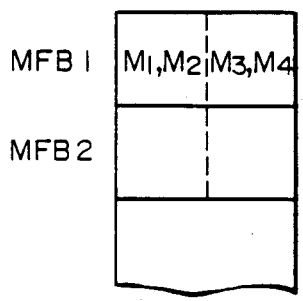
Figure 10A:
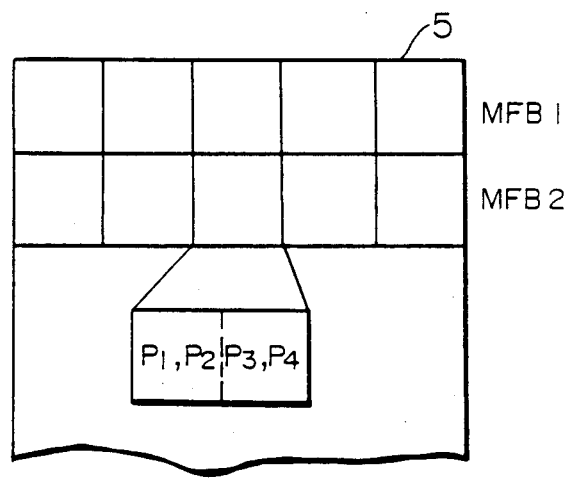

As already described, the position data of the field block including all the figure covering rectangles for the figure data stored in one field block memory region, i.e. the bottom leftmost coordinates and the top rightmost coordinates of that field block are stored in the area corresponding to the one field block memory region within a field block memory managing unit 20 in the manner illustrated in FIG. 9B. To this end, the figure storing memory region determining unit 16 sends to the field block memory region managing unit 20 the position data contained in the figure data of the figure covering rectangle to be first stored in one field block memory region, whereby the abovementioned position data is stored in an area of the field block memory region managing unit 20 corresponding to the field block memory region in which the figure data of the figure covering rectangle of concern is stored. When the data of the second and following figure covering rectangles are to be stored in the same field block memory region, the figure storing memory region determining unit 16 makes decision as to whether change occurs in the extent of the existing field block due to the addition of the figure covering rectangle. When such change takes place, the position data stored in the managing unit 20 is updated. By way of example, in the case where the position data of the existing field block are given by the bottom leftmost coordinates (P1, P2) and the top rightmost coordinates (P3, P4) of that block, it is assumed that the position data of the figure covering rectangle to be newly added are given in terms of the bottom leftmost coordinates (P'1, P'2) and the top rightmost coordinates (P'3, P'4). In that case, the coordinates P'1 and P1 are compared with each other. When the comparison shows that P'1<P1, the coordinates P1 are altered to the coordinates P'1. Similarly, when P'2<P2, then P2 is altered to P'2, while P3 is altered to P'3 if P'3>P3 with P4 being altered to P'4 if P'4>P4. When the figure storing memory region determining unit 16 decides that the figure data of the newly received figure covering rectangle is to be stored in the succeeding field block memory region, this decision is also messaged to the field block memory region managing unit 20, whereupon the managing unit 20 decides that the field block for the latest position data stored therein has already been determined and sends that position data to the field block data storing region determining unit 24. In response, the field block data storing region determining unit 24 determines the macro field block memory region in which the received position data of the field block are to be stored, whereby the position data of concern are stored in the macro field block memory region in such manner as shown in FIG. 10A. Further, the field block data storing region determining unit 24 sends to the macro field block memory region managing unit 22 the macro field block formed of the field blocks associated with the position data stored in the macro field block memory region, whereby the macro field block is stored in the macro field block memory region managing unit 22 in such manner as illustrated in FIG. 10B. Also in this case, decision is made as to whether the new position data of the field block inputted to the field block data storage region determining unit 24 brings about change in the extent of the associated macro field block. If it is decided that the extent is changed, the position data of that macro field block are altered. Since the determination of the region for storing the field block position data as well as alteration of the macro field block position data is carried out in the utterly same manner as the determination of the field block memory region for storing the received figure data of the individual figure covering rectangle as well as alteration of the position data of the corresponding field block made by the figure storing memory region determining unit 16, further description in detail will be unnecessary. In this way, lots of figure data of a given drawing are stored in the field block memory and the macro field block memory.

When any figure overlapping with a given designated window is to be extracted, the program running on until then is changed over to a figure extracting program for extracting the figure overlapping with the inputted window from the stored figure data. Designation of the window is carried out by supplying to the drawing editing unit 18 the window information containing the corner apex coordinates of that window from the tablet 12. The drawing editing unit 18 compares first the window information with the position data of each macro field block stored in the macro field block memory region managing unit to thereby extract all the macro blocks which are at least partially included in the window. Subsequently, the position data of the individual field blocks included in each extracted macro field block are read out from the field block memory region managing unit 20 to be compared with the abovementioned window information for thereby extracting all the field blocks which are at least partially included in the window.

Next, the position data of each figure covering rectangle contained in each extracted field block are compared with the window information mentioned above for thereby extracting all the figures which are at least partially included in the window. Through comparison of the figure data of the figure included by each extracted figure covering rectangle with the abovementioned window information, the figure included in the window is extracted. Since the procedure described above is similar to that of the conventional drawing information processing apparatus, any further description will be unnecessary.

Figures 12, 13:
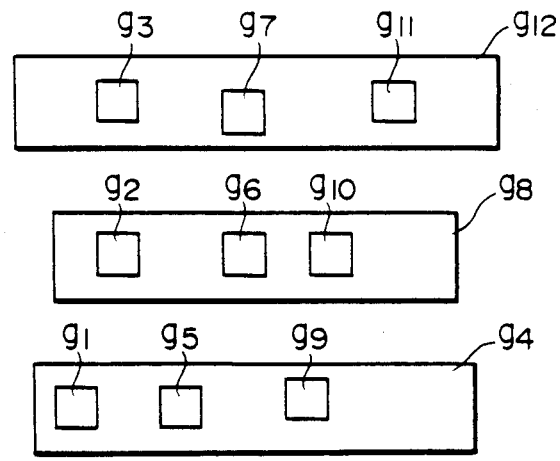
FIGS. 12, 13 and 14 are views for illustrating the problems as brought about by coexistence of large-size figures and small-size figures in one and the same drawing.

The first embodiment of the invention described above gives rise to no problem so far as all the sizes of the individual figures included in one drawing lie with a predetermined range. However, when various sizes of figures coexist mixedly in one drawing, inconvenience may possibly arise in the processing of the drawing information. Definition of the size of a figure will here be made. The size of a figure is represented by the length of a diagonal of a rectangle covering that figure. In this connection, the sizes of the figures included in one drawing and having magnitudes between the maximum size and the minimum size are classified into several groups or classes in dependence on the lengths of diagonals of the associated figure covering rectangles. Now, taking as an example the simplest case in which the figures are classified into two groups, i.e. a first group of large-size figures covered by the rectangles having respective diagonals of lengths greater than a predetermined value and a second group of small-size figures covered by the rectangles having respective diagonals of lengths smaller than the predetermined value, the problems due to the coexistence of the large and small-size figures on one drawing will be described by reference to FIGS. 12, 13 and 14. Referring to FIG. 12, there are shown twelve figure covering rectangles for the figures identified by the figure numbers $g_1$ to $g_{12}$, of which the figures $g_4$, $g_8$ and $g_{12}$ are the large-size figures with the others being small-size figures. The figure data of these figures are stored in the field block memory regions FB1, FB2 and FB3 in the order of the figure identification numbers in accordance with the teaching incarnated in the first embodiment of the invention, as is shown in FIG. 13. The field blocks corresponding to the field block memory region FB1 constitute a rectangle containing the figure covering rectangles $g_1$, $g_2$, $g_3$ and $g_4$. The field blocks corresponding to the field block memory region FB2 constitutes a rectangle containing the figure covering rectangle $g_5$, $g_6$, $g_7$ and $g_8$. The field blocks corresponding to the field block memory region FB3 constitute a rectangle containing the figure covering rectangles $g_9$, $g_{10}$, $g_{11}$ and $g_{12}$. These field blocks FB1, FB2 and FB3 are of approximately same size and have respective major portions overlapping one another. Consequently, it would be meaningless to manage the figures by classifying them in the field blocks.

Figure 15A:
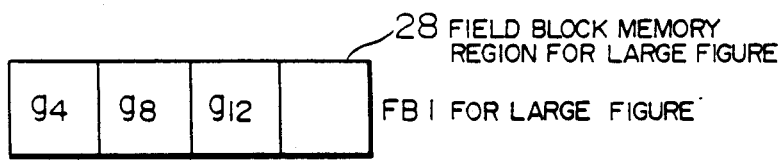
FIGS. 15A, 15B and 16 are views for illustrating the basic concept underlying a second embodiment of the present invention.
Figure 15B:
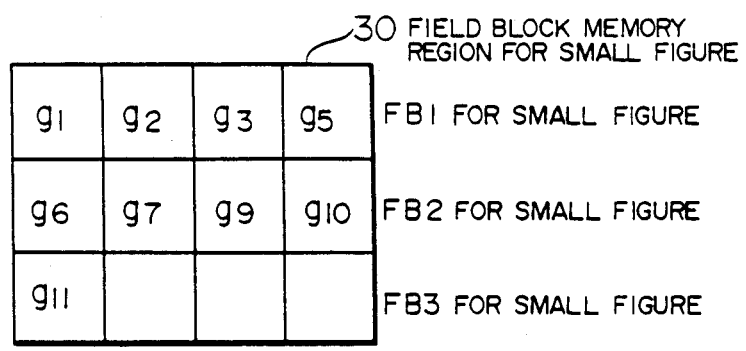
Figure 16:
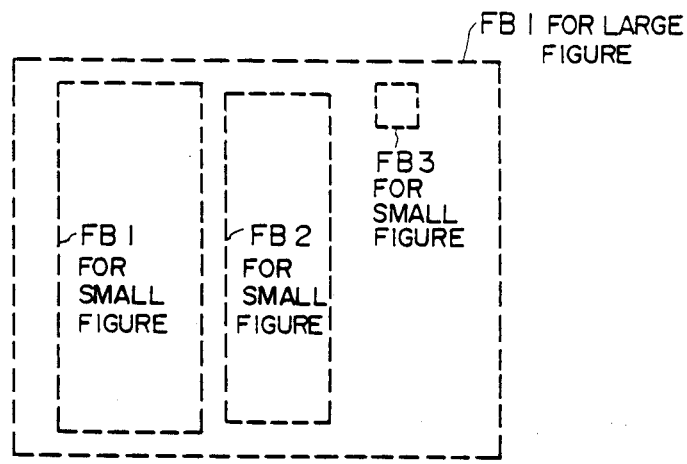

The second embodiment of the present invention is directed to the processing of the drawing information for the case of in which figures of various or different sizes coexist in one drawing. In the following description of the second embodiment made by reference to FIGS. 15A, 15B and 16, it is assumed, by way of example, that large-size figures and small-size figures coexist mixedly in one drawing, as with the case shown in FIG. 12. According to the second embodiment of the invention, all the figures are classified with reference to the size, wherein the figures belonging to the same class or group are managed by the field block method as with the case of the first embodiment. When all the figures are classified into two groups or classes, i.e. the class of large-size figures and the class of small-size figures, by way of example, there are prepared large-size figure field block memory regions 28 each of a fixed size and small-size figure field block memory regions 30 each of a fixed size, wherein in each region, the upper limit of the usable range is determined as a function of the number of large and small-size figures included in the drawing. Again assuming that the large-size figures and the small-size figures are disposed in the manner shown in FIG. 12, the figure data of the large-size figures $g_4$, $g_8$ and $g_{12}$ are stored in the large-size figure field block memory region FB1, the figure data of the small-size figures $g_1$, $g_2$, $g_3$ and $g_5$ are stored in the small-size figure field block memory region FB1, the figure data of the small-size figures $g_6$, $g_7$, $g_9$ and $g_{10}$ are stored in the small-size figure field block memory region FB2, and the figure data of the small-size figure $g_{11}$ is stored in the memory region FB3, as will be seen in FIG. 15A. Accordingly, the field blocks corresponding to the large-size figure FB1 and the small-size figure FB1, FB2 are FB3 bear such relations to one another as illustrated in FIG. 16. It will be seen that amount of mutual overlap of the field blocks of different sizes is decreased, thus making it possible to manage efficiently the drawing information. Parenthetically, the number of stages involved in the processing of the field blocks of different sizes are determined separately in dependence on the numbers of the figures belonging to the different classes of sizes included in one drawing.

Figure 17:
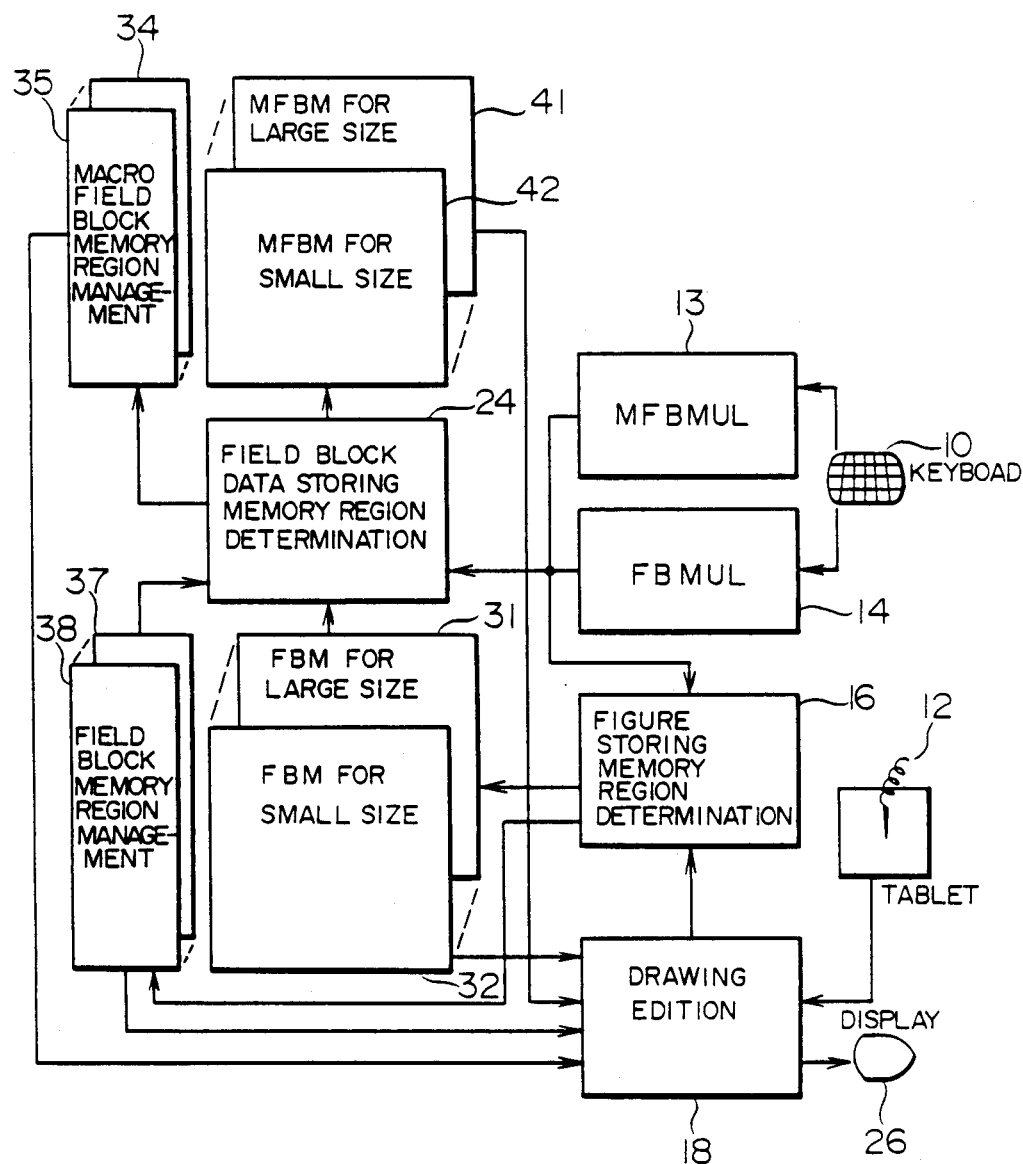
FIG. 17 is a view showing an arrangement of a drawing information processing apparatus according to a second embodiment of the invention.

Next, in conjunction with the case where the large-size figures and the small-size figures coexist mixedly in one drawing, an arrangement of the drawing information processing apparatus for processing the figure data of the figures of different sizes in two stages will be described by referring to FIG. 17. Difference of the apparatus shown in FIG. 17 from the one shown in FIG. 11 is seen in that the former is provided with the macro field block memory regions 41 and 42 for large-size figures and small-size figures, respectively, the field block memory regions 31 and 32 for large and small-size figures, respectively, the macro field block memory region managing units 34 and 35 for large and small-size figures, respectively, and the field block memory region managing units 37 and 38 for large and small-size figures, respectively. The figure storing memory region determining unit 16 decides on the basis of the figure data received from the drawing editing unit 18 whether the figure of concern is large or small-size figure and sends the received data to either one of the field block memory region 31 for large-size figure or the memory region 32 for small-size figure on the basis of the result of decision mentioned above, while sending correspondingly the position data to either one of the field block memory region managing unit 37 for large-size figure or the managing unit 38 for small-size figure, whereby the figure data are processed separately for each of the different figure sizes. Except for this function, the drawing information processing apparatus shown in FIG. 17 operates similarly to the apparatus shown in FIG. 11. The field block data storing region determining unit 24 processes the data received from the field block memory region 31 or 32 and the field block memory region managing unit 37 or 38 separately in accordance with the figure sizes. However, so far as the processing of the figure data for the figures of a same size is concerned, the processing is performed similarly to that executed in the apparatus shown in FIG. 11.

Decision as to whether each of the figure data is of large-size figure or small-size figure can be made on the basis of the relevant position data by deciding whether the length of diagonal of the associated figure covering rectangle is greater or smaller than the predetermined value. Further, in the case where figures are located in several layers and in which the size of a figure can be at least approximately determined by the layer in which that figure is present, as in the case of a mask pattern for a VLSI, a code indicating the layer in which the figure of concern is present, i.e. a code indicating the character or feature of that figure may be included in the associated figure data so that the size of that figure can be determined on the basis of the code.

Figure 14:
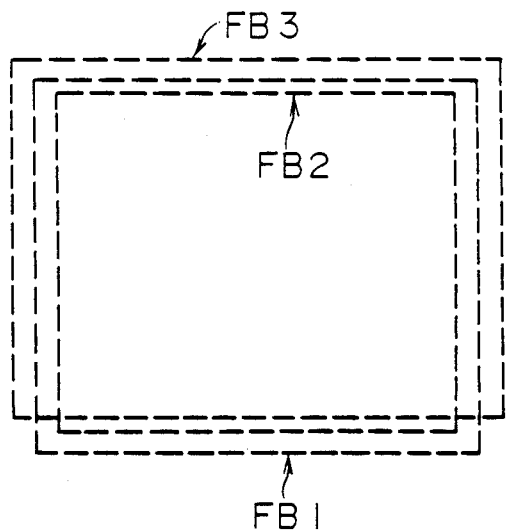

The drawing information processing apparatus according to the first and second embodiments of the invention are implemented in accordance with the concept underlying the field block method. In this context, it will be noted that individual field blocks may overlap one another in such a manner as shown in FIG. 14 even for the figures having a substantially same size in dependence on the locations of the figures in the drawing or the sequence in which the figure data of the individual figures are inputted, resulting in that all the field blocks may be viewed in the designated window. In that case, the drawing data processing in accordance with the field block method will lose its significance. To solve this problem, it is proposed according to a third embodiment of the invention that one drawing is divided into a plurality of buckets each having a same size, wherein the field block method is applied to the figure covering rectangle(s) included in each of the buckets. Further, when the field block method is applied in the plural stages for dealing with a large number of figures, the drawing is divided into macro buckets each of a size increased corresponding to each stage. Now, the principle of the bucket division method allowing application of the field block method, for example, in three stages will be explained below by reference to FIGS. 18 to 23.

Figure 18:
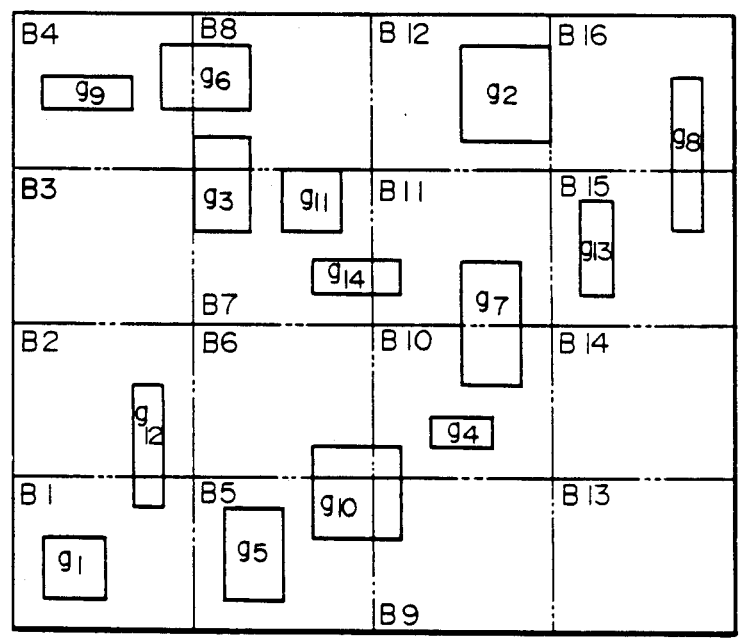
Figures 20, 21:
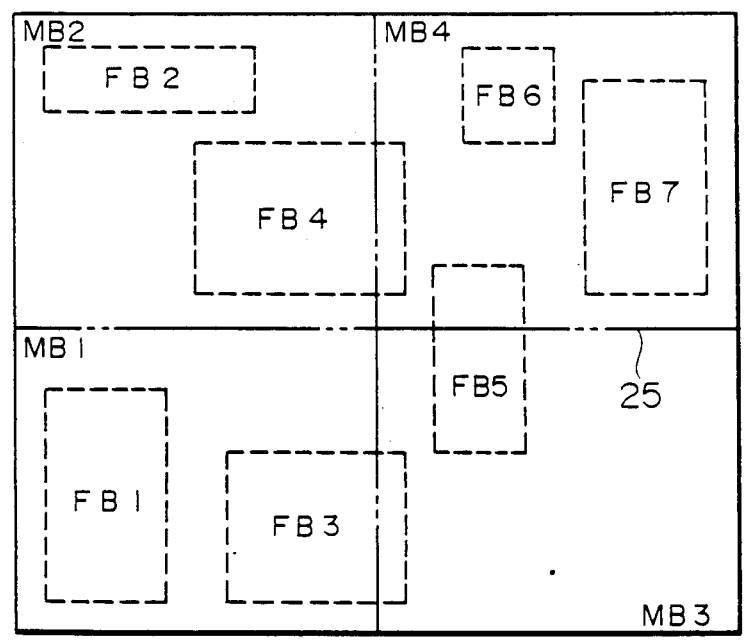
Figure 22:
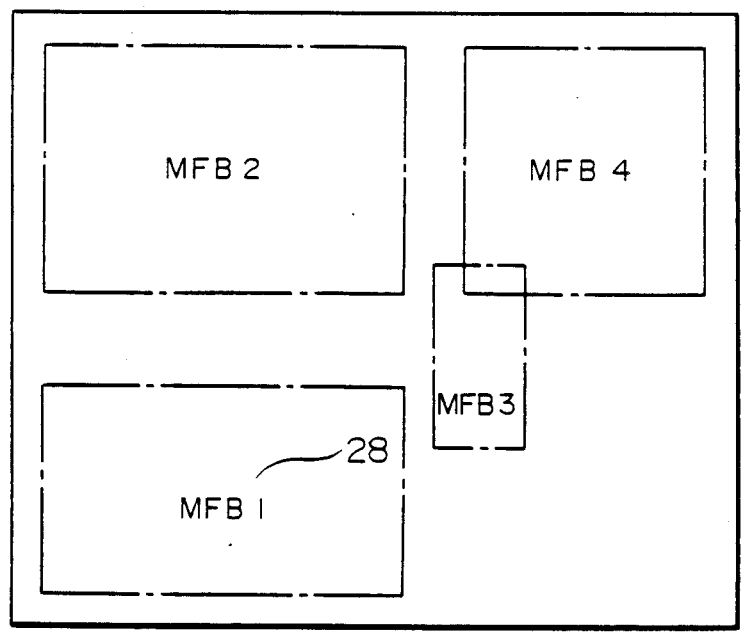

FIG. 18 shows a drawing including the figure covering rectangles $g_1$ to $g_{14}$ and divided into sixteen buckets B1 to B16. Each figure covering rectangle is regarded to be included in the bucket in which the bottom leftmost coordinates of the rectangle are located. In case the bottom leftmost coordinate point of a figure covering rectangle is located on a boundary line between two adjacent buckets, that rectangle is regarded to be included by the bucket whose bottom side or left side coincides with that boundary line. FIG. 19 shows relations between the individual buckets and the figure covering rectangles included by the buckets. The field block method is applied to the figure covering rectangle(s) on the bucket basis. Let's consider the bucket B1, by way of example. Since this bucket B1 includes two figure covering rectangles $g_1$ and $g_2$, the figure data of these two figure covering rectangles are stored in the field block memory region FB1. Similarly, the buckets B4, B5, B7, B10, B12 and B15 are allocated with the field block memory regions FB2 to FB7 for storing the figure data of the figure covering rectangles included in these buckets, respectively. The remaining buckets which include none of the figure covering rectangle are allocated with no field block memory region. The layout of the field blocks thus determined will be such as shown in FIG. 20. In the three-stage processing, drawing is divided into a plurality of congruent macro buckets of greater size than that of the bucket for the purpose of managing of these field blocks. In the case of the example shown in FIG. 20, the drawing is divided into four macro buckets MB1, MB2, MB3 and MB4. It is established that each field block is included in the macro bucket in which the bottom leftmost coordinate point of the block is located. In case the bottom leftmost coordinate point of a field block lies on a boundary line between two adjacent macro buckets, it is ruled that the field block of concern is included by the macro bucket whose bottom side or left side is defined by that boundary line. FIG. 21 shows the macro buckets defined in this manner together with the field blocks included in the macro buckets. The macro buckets are allocated with macro field block memories, respectively, for storing the figure data of the field block(s) included in the macro buckets.

The combination of the field block method with the bucket division in this manner provides advantage in that the probability of overlapping of the field blocks is remarkably reduced because of definition of the field block on the bucket basis. Besides, by selecting appropriately the number of the bucket divisions or macro bucket divisions, there can be realized one-to-one correspondence between the field block on the macro field block and the bucket or macro bucket, respectively. In other words, it is possible to make the number of the buckets or the macro bucket at least approximately equal to that of the field blocks or macro field blocks. Assuming now that the number of the bucket divisions is equal to that of the field blocks and that the number of the macro buckets is equal to that of the macro blocks, the time required for the processing to extract the figure overlapping with one window is given by the expression (5) provided that the processing is performed through the three-stage method. Accordingly, the optimal value for the number of buckets and hence the number of the field blocks represented by N is given by the expression (7) mentioned hereinbefore, while the optimal value for the number of the macro buckets and hence that of the macro field block represented by M is given by the expression (6).

When the window is of a normal size, m1 and m2 may be considered to be equal to "1". Accordingly, $$N = n^{2/3} \tag{10}$$
$$M = n^{1/3} \tag{11}$$

In other words, in the case of the three-stage processing, the time required for the processing to extract the figure overlapping with a designated window can be reduced to a minimum by dividing the drawing into N ($=n^{\frac{2}{3}}$) buckets having a same size and an identical shape in correspondence to the field blocks FB or by dividing into M ($=n^{\frac{1}{3}}$) macro buckets in correspondence to the macro field blocks MFB.

In general, in the case of k-stage processing, the numbers of bucket divisions corresponding to the field blocks at every stage are selected to be $n^{(k-1)/k}$, $n^{(k-2)/k}, \ldots, n^{1/k}$, respectively.

Figure 23A:
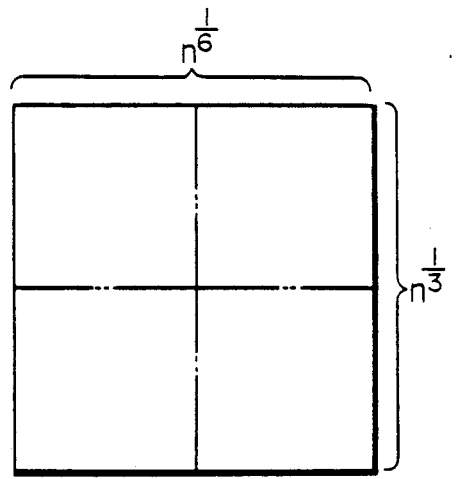
Figure 23B:
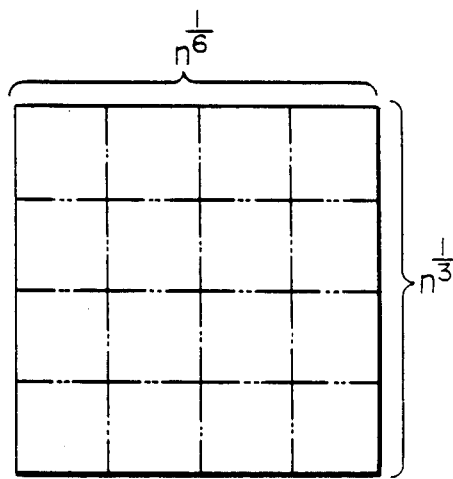

The drawing is divided in a lattice or grid-like pattern so as to be divided in the number based on the expressions mentioned above. By way of example, in the case of the three-stage processing, the buckets for the field blocks are defined by dividing the drawing lengthwise and widthwise by $n^{\frac{1}{3}}$ as shown in FIG. 23A, while the macro buckets for the macro fields can be defined by dividing the drawing lengthwise and widthwise by $n^{1/6}$, as shown in FIG. 23B. It should however be understood that the numbers of divisions of the drawing in both directions need not always be equal to each other. In correspondence with each of the buckets thus derived, one field block memory region is prepared. Similarly, for each of the macro buckets, one macro field block memory region is prepared. For simplicity of explanation, FIG. 19 shows some buckets including no figure covering rectangle, but it should be understood that in practical case, each of the buckets generally includes at least one figure or one figure covering rectangle and also each macro bucket generally includes at least one field block. In operation, as the operator inputs sequentially figures by means of the tablet, the figure data of the inputted figures are stored in the field block memory regions corresponding to the buckets in which the bottom leftmost coordinates of the rectangles covering the inputted figures are located, respectively. In case all the figure covering rectangles included in one bucket could not be stored in one field block memory region, then that bucket is allocated with a new field block memory region, and so forth.

When large-size figures and small-size figures coexist mixedly in one drawing, it is desirable to manage the figure data by providing separately the field block memory regions and the macro field block memory regions for the small-size figures and the large-size figures, respectively. In that case, the division of the drawing into the buckets for the field blocks and the division into the macro buckets for the macro field blocks should preferably be applied separately for the small-size figures and the large-size figures, respectively, in efficiency of extracting the figure overlapping with a given window. However, the bucket division may be realized in common to the small and large-size figures for the purpose of simplifying the structure of the apparatus. In this case, one field block memory region and one macro field block memory region may be allocated to one bucket.

Figure 24:
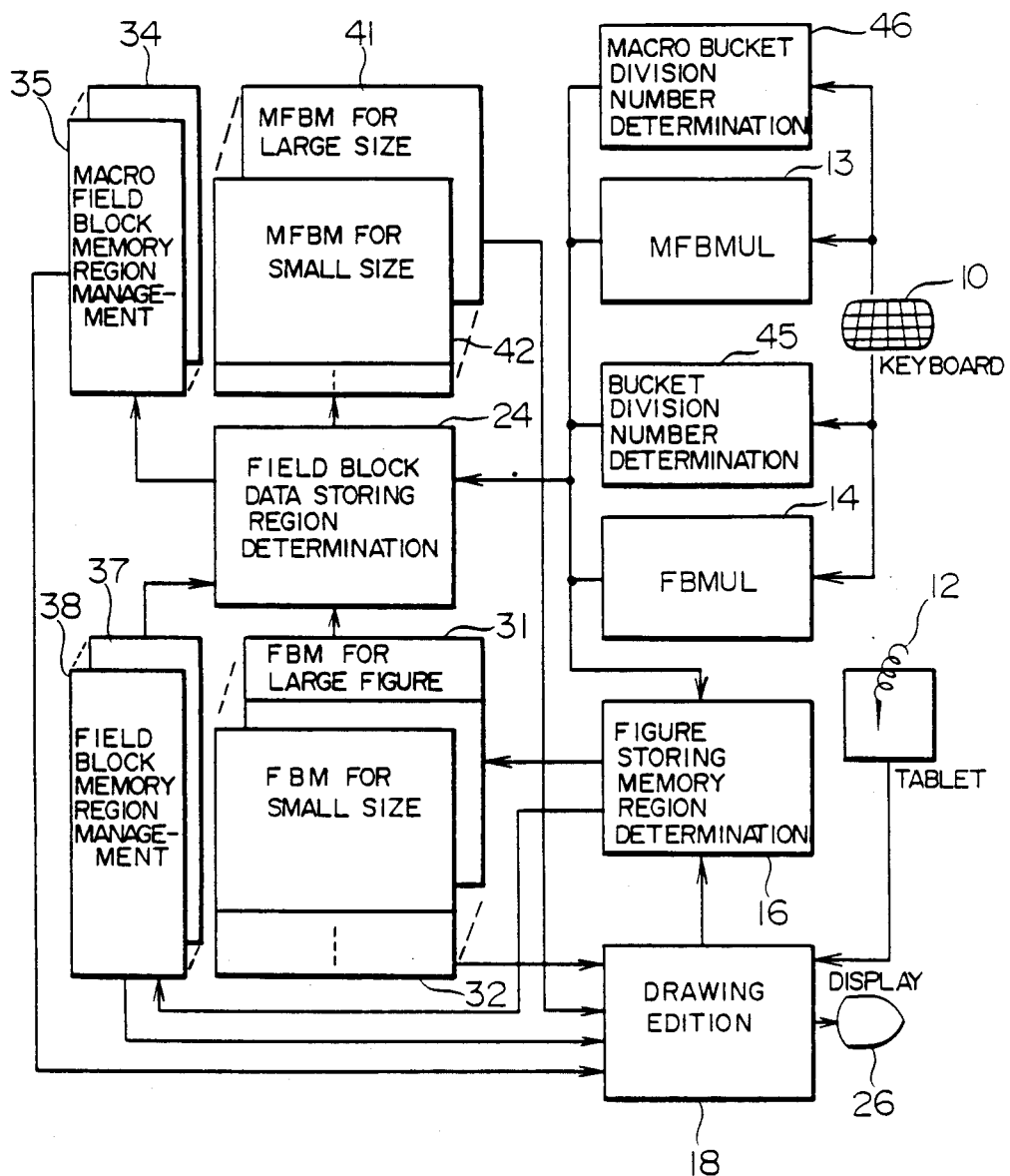
FIG. 24 is a view showing an arrangement of the drawing information processing apparatus according to the third embodiment of the invention.

The drawing information is managed in the manner described above according to the third embodiment of the invention. A structure of the apparatus for carrying out the managing of the drawing information according to the third embodiment will now be described by reference to FIG. 24 on the assumption that the bucket division is applied in common to both large-size figures and small-size figures. In FIG. 24, same or like elements as those shown in FIG. 17 are denoted by same reference numerals. Comparison of FIG. 24 with FIG. 17 shows that a bucket division number determining unit 45 and a macro bucket division number determining unit 46 are additionally provided in the apparatus shown in FIG. 24. On the basis of the total number n of the figures in a drawing and the values of m1 and m2 inputted through the keyboard 10, the bucket division number determining unit 45 and the macro bucket division number determining unit 46 determine the number N for the bucket divisions and the number M for the macro bucket divisions. Since the values of m1 and m2 are ordinarily equal to "1", these values may previously be set in the bucket division number determining unit and the macro bucket division number determining unit, respectively, to thereby spare the inputting operation through the keyboard.

The values of N and M as determined are supplied to the figure storing memory region determining unit 16 and the field block data storing region determining unit 24. The figure storing memory region determining unit 16 determines on the basis of the value of N the bottom leftmost coordinates of the individual buckets resulting from division of the drawing by N and prepares a collation (look-up) table containing the buckets and the corresponding addresses of the field block memory regions for the large and small-size figures, the prepared table being held by the figure storing memory region determining unit 16. Likewise, the field block data storing memory region determining unit 24 determines on the basis of the value M the bottom leftmost coordinates of the macro buckets resulting from division by M and prepares the collation table containing correspondences between the individual macro buckets and the addresses of the macro field block memory regions for large and small-size figures, the table thus prepare being held in the field block data storing memory region determining unit 24. On the other hand, the drawing editing unit 18 determines on the basis of the figure information of the individual figures inputted by operator through the tablet 12 the figure covering rectangles of the inputted figures and supplies the figure data containing the position data of the figure covering rectangles to the figure storing memory region determining unit 16, which responds thereto by deciding whether the figure of concern is of large or small size on the basis of the figure data and subsequently determines the bucket by which the figure of concern is included by comparing the bottom leftmost coordinates of the relevant figure covering rectangle contained in the position data with those of the individual buckets. Subsequently, the figure data is stored in the field block memory region determined for the large-size figure or the small-size figure and having the address corresponding to the bucket in which the figure of concern is located. Similarly, the field block data storing region determining unit 24 compares the bottom leftmost coordinates of the individual buckets with those contained in the position data of the field block supplied from the field block memory region managing unit 37 (for large-size figure) or 38 (for small-size figure) to thereby determine the macro bucket in which the field block of concern is included, whereby the position data for the field block of concern is stored in the macro field block memory region 41 (for the large-size figure) or 42 (for the small-size figure) allocated with the address corresponding to the determined macro bucket.

There may arise such situation in which a large number of the figures are included in one bucket, resulting in that the one field block memory region allocated initially is insufficient for storing the figure data. In that case, every time one field block memory region is filled up, the figure storing memory region determining unit 16 allocates newly a fresh field block memory region to the bucket, and adds the address of the newly allocated field block memory region to the collation table, while entering in the table a code indicating the filled-up field block memory region. Similar processing is also performed by the field block data storing region determining unit 24 for the macro field block memory regions managed by that unit 24. Other functions of the apparatus shown in FIG. 24 are similar to those of the apparatus described hereinbefore in conjunction with FIG. 17.

Figure 25:
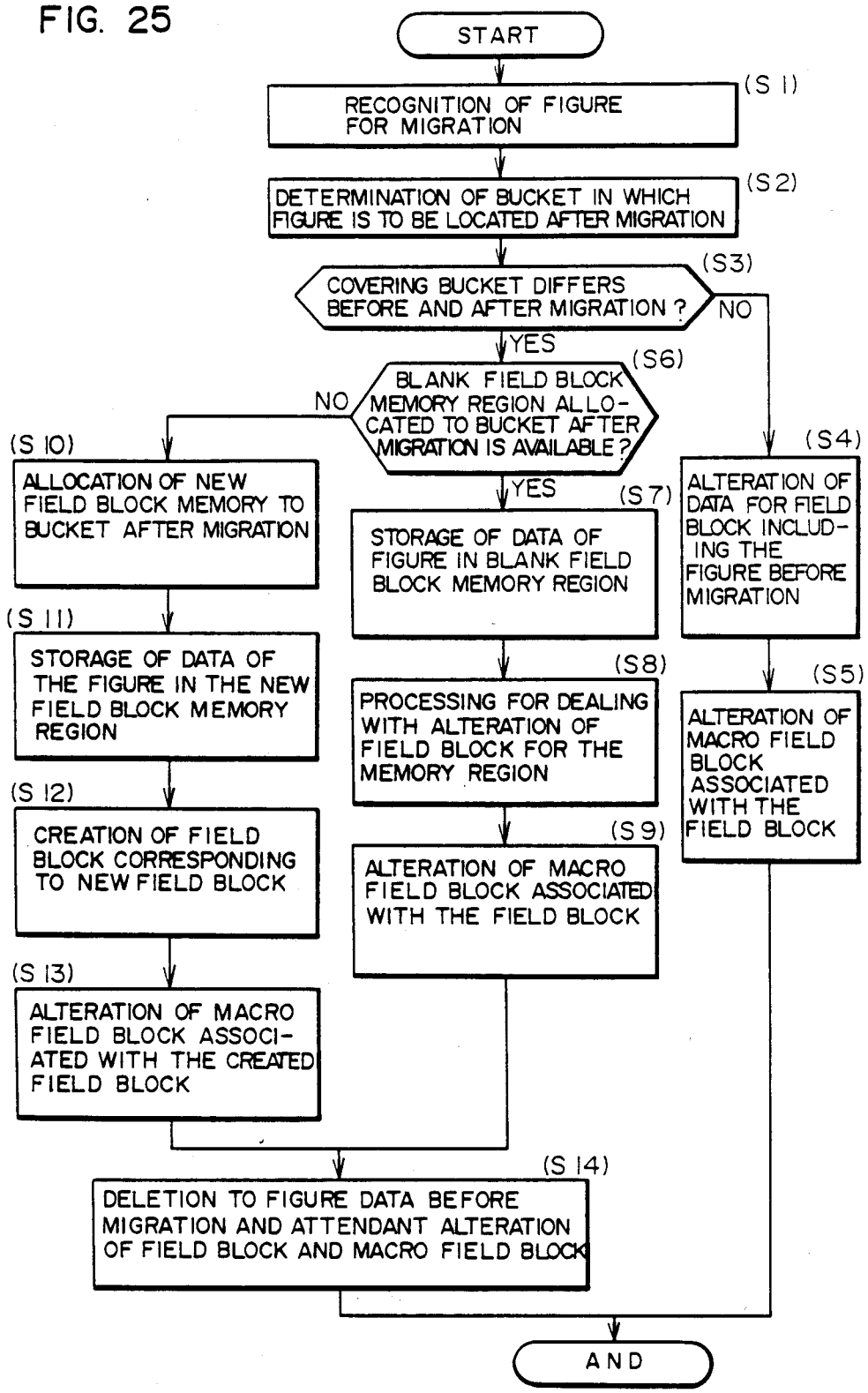
FIG. 25 shows in a flow chart a processing for migrating or moving a figure.
Figure 26:
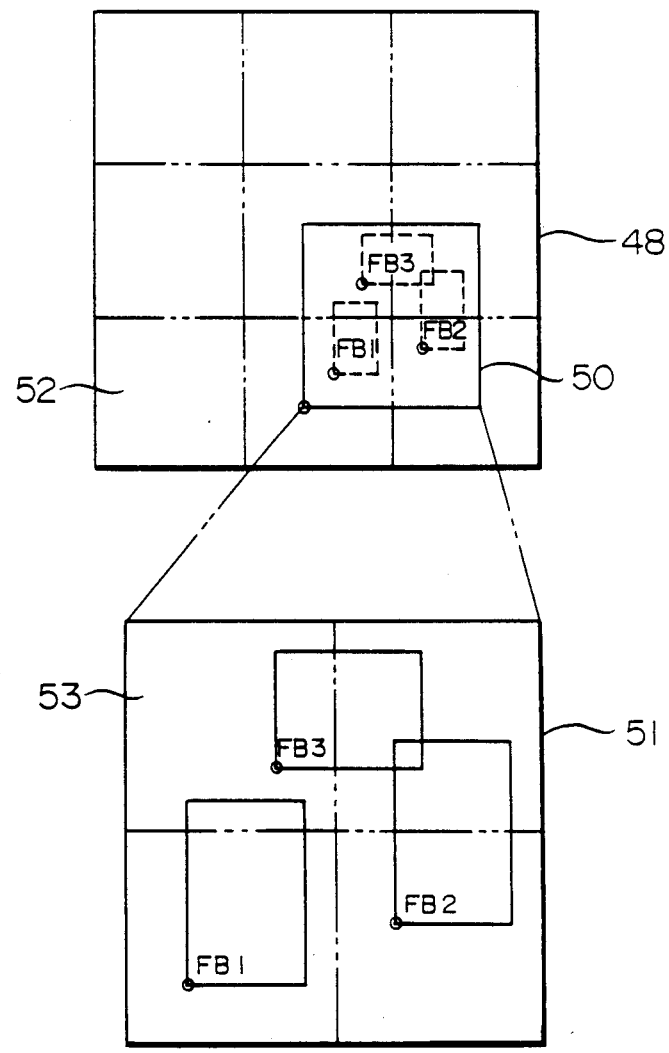
FIG. 26 is a view illustrating a processing for inserting another drawing in a particular blank portion of a drawing.

Next, description will be turned to alternation of the drawing information stored already such as, for example, the processing for moving or migrating a certain figure. Basically, this processing is a combination of the processing for deleting the data of the figure of concern stored already and the processing for inputting the data of the figure to be migrated or moved by regarding it as a new figure. In this conjunction, it is noted that the figure after migration differs from that before migration only in respect to the position with the shape being held intact. Accordingly, the figure data after migration can be readily created by a known method from the figure data before migration, provided that the direction and the distance of migration or movement are available. For moving a figure having the figure data stored on a drawing in the apparatus shown in FIG. 24, the program is changed over to a figure migration routine which is executed through such procedure as illustrated in a flow chart of FIG. 25. Now, description will be made by reference to the individual steps shown in FIG. 25.

Step S1: First, operator inputs a point located in the vicinity of a figure to be moved on a drawing. A small window is formed with reference to the input point to extract the figure data of the figures overlapping with the window from the memory. Of the figure thus extracted, the one located closest to the input point is decided a the figure to be moved or migrated, whereupon the procedure proceeds to the next step S2.

Step S2: Next, operator inputs the information of movement or migration including the direction and the distance therefor with the tablet, whereupon the figure data of the figure after migration are arithmetically determined on the basis of the abovementioned information of migration and the figure data of the figure before migration. The figure data thus determined is used for determining the position data of a rectangle which is to cover the figure after migration, to thereby determine the bucket in which the figure covering rectangle of concern is located. The processing then proceeds to a step S3.

Step S3: Decision is made as to whether the bucket in which the figure covering rectangle is located becomes different. If so, the processing proceeds to a step S4, and otherwise to a step S6.

Step S4: Within the field block memory region in which the figure data before migration is stored, the figure data before migration is altered to the figure data after the migration. Further, the relevant data is altered in accordance with alteration of the field block corresponding to the field block memory region of concern. The processing then proceeds to a step S5.

Step S5: Since the relevant macro field block is altered due to the alteration of the abovementioned field block, the data affiliating with the alteration are correspondingly altered, whereupon the processing comes to an end.

Step S6: Decision is made as to whether there is present a blank field block memory region allocated to the bucket in which the figure is located after migration. If present, the processing proceeds to a step S7 and otherwise to a step S10.

Step S7: The figure data of the figure after migration is stored in the abovementioned blank field block memory region. The processing then proceeds to a step S8.

Step S8: When the storage of the figure data of the figure after migration in the blank field block memory region mentioned above brings about a change in the extent of the corresponding field block, the relevant processing inclusive of alteration of the data in the field block memory region managing unit is executed. The processing proceeds to a step S9.

Step S9: When the alteration of the field block mentioned above brings about alteration of the corresponding macro field block, the relevant processing inclusive of alteration of the data stored in the corresponding macro field block memory region managing unit is executed. The processing then proceeds to a step S14.

Step 14: The figure data of the figure before migration is deleted from the associated field block memory region with the relevant field block and macro field block being correspondingly altered, whereupon the processing comes to an end.

Step S10: A new field block memory region is allocated to the bucket in which the figure after migration is located. The processing then proceeds to a step S11.

Step 11: The figure data of the figure after migration is stored in the newly allocated field block memory region. The processing then proceeds to a step S12.

Step 12: A field block corresponding to the new field block memory region is created with the attendant data processing being executed. The processing then proceeds to a step S13.

Step 13: Processing for alteration of the macro field block affiliating with the creation of the field block mentioned above is executed, to proceed to a step S14 where the processing comes to an end.

In the processing described above, the routines including steps S7 to S9 and steps S10 to S13 are same as those executed in the ordinary drawing information input processing when the blank field block memory region allocated to the bucket in which new figure data as inputted is located is available and unavailable, respectively.

The foregoing description of the processing for the movement of the figure has been made on the assumption that the figure is migrated. It should however be appreciated that similar procedure may be applied to the processing for rotation of the figure about a given point by a given angle, mirror inversion for transforming the figure symmetrically with reference to a given straight line, and magnification as well as contraction of the figure. In any case, the figure data after transformation is arithmetically determined on the basis of the figure data before transformation in consideration of the conditions for transformation (such arithmetic determination itself is well known in the art), wherein the processing described above by reference to FIG. 25 is applied with only difference in the calculation for determining the figure data before and after the transformation.

Next, a version of the transformation of the drawing information will be described. In connection with the storage of the drawing information in accordance with one of the exemplary methods illustrated in FIGS. 1 to 3, let's suppose that all the figures included in a specific region 50 of a parent drawing are omitted with only the data indicating the position of that specific region being stored, while the figure within the specific region 50 of the parent drawing is transferred to copied onto a daughter drawing 51. In that case, by employing the bucket division method in combination with field block method, a part of the field block memory region and a part of the associated managing region shown in FIG. 24 are allocated to the daughter drawing. When the size of the figures in the daughter drawing is large, a part of the macro field block memory region and a part of the associated managing region are allocated for allowing the two stage processing to be executed, quite similarly to the ordinary storage of the figure data. Since the daughter drawing differs from the parent drawing in the scale, the numbers of the buckets resulting from division of the drawings naturally differ from each other. Although the field blocks FB1, FB21 and FB3 of the daughter drawing 51 are formed of the figures included in the specific region 50 of the parent drawing 50, they are not illustrated in the parent drawing. This form of storage of the figure data can be conveniently adopted in such case in which a large number of drawings which differ one another as a whole but have specific regions in common to one another are to be stored. In that case, the parent drawings may be stored with respective specific regions being left blank, wherein the detailed figure layout in the common specific regions of the parent drawings is stored in the form of the single daughter drawing. Further, the separate preparation and storage of the parent and daughter drawings as described above are advantageously adopted in such a case where different designers are in charge of designing a specific region and the other region, respectively, in one drawing, wherein the specific region is left as the blank region in the parent drawing and is handled as the daughter drawing.

Figure 27:
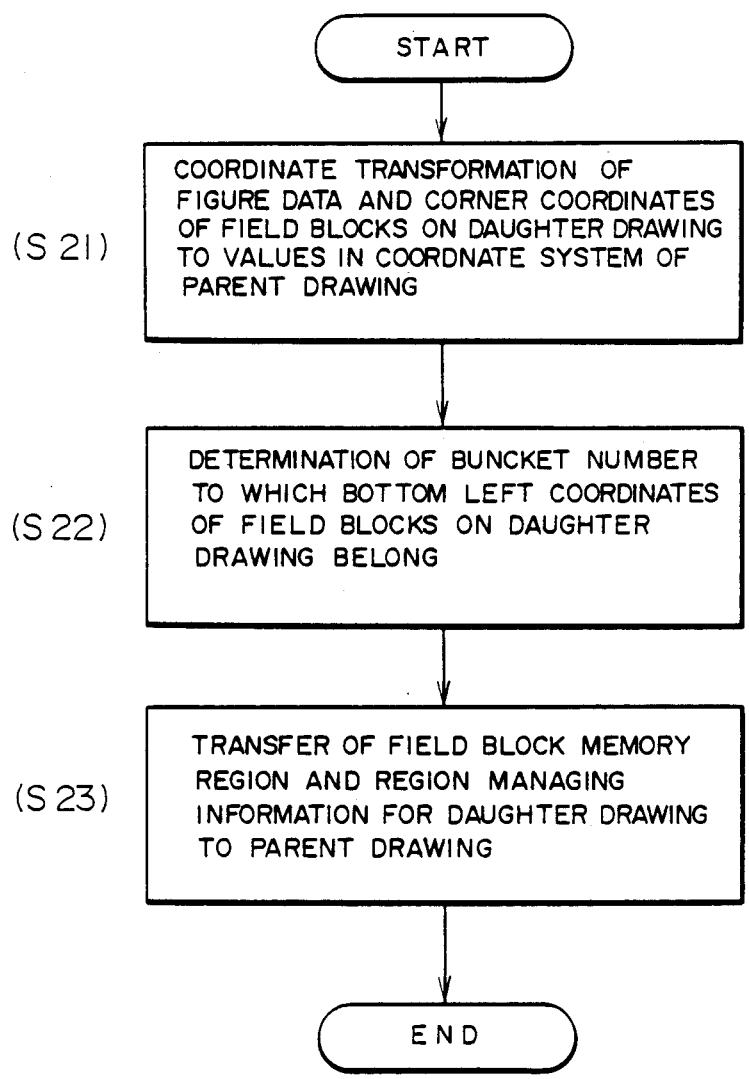
FIG. 27 shows in a flow chart a manner in which the drawing insertion processing shown in FIG. 26 is executed.

When a drawing is to be edited from the figure data for a parent drawing and a daughter drawing illustrating at least partially a specific region of the parent drawing which data have been stored in the manner described above, the figure data for the daughter drawing is copied into the figure information of the parent drawing through the procedure including steps S21 to S23 shown in FIG. 27.

Step S21: By referencing to the bottom leftmost coordinates and the top rightmost coordinates of the specific region 50 in the parent drawing 48 as well as the bottom leftmost coordinates (ordinarily 0, 0) and the top rightmost coordinates of the daughter drawing 51, the data stored in the field block memory regions allocated to the daughter drawing and indicating in conjunction with the position of the figures in the coordinate system of the daughter drawing the bottom leftmost coordinates and the top rightmost coordinates of the field blocks FB1, FB2 and FB3 are transformed into the data applicable to the coordinate system of the parent drawing.

Step S22: On the basis of the data representing the bottom leftmost coordinates of the individual field blocks in the coordinate system of the parent drawing, the buckets of the parent drawing in which the individual field blocks are included are determined.

Step 23: A new field block memory region is allocated to the buckets including the block fields, whereupon the data stored in the field block memory region for the daughter drawing and transformed to the data in the coordinate system of the parent drawing are copied or transferred to the newly allocated field block memory region.

Of course, the figure data undergone the coordinate transformation so as to be applicable to the parent drawing may be stored in the field block memory region for the parent drawing as the fresh figure data. However, it is preferred to allocate the new field block memory region to the bucket including the individual field blocks and copy the data stored in the field block memory region for the daughter drawing to the newly allocated field block memory region after the coordinate transformation in view of the advantage that the time required for the processing to this end can be remarkably shortened.

According to the embodiment of the invention described in the foregoing, the processing for extracting the figures viewed in the window can be performed at high speed by virtue of the multi-stage management of the figures based on the field block method (first embodiment), the multi-stage management based on the classification or grouping of the figures in accordance with the sizes thereof (second embodiment) and the multi-stage management making use of the bucket division of the drawing (third embodiment). In conjunction with the effectiveness of the multi-stage processing, it is noted that on the condition that the sizes of both field block memory and macro field block are controlled to the respective optimal values, the times $T_2$ and $T_3$ required for extracting the figure covering rectangles g overlapping with the window in the two-stage and three-stage processings, respectively, can be expressed from the aforementioned expressions (5), (8) and (9) as follows:

$$T_2 = 2(m_1 \cdot n)^{\frac{1}{2}} \cdot t_o \qquad \ldots \ldots (12)$$

$$T_3 = 3(m_2 \cdot m_1 \cdot n)^{\frac{1}{3}} \cdot t_o \qquad \ldots \ldots (13)$$

In other words, the effect of the multi-stage managing becomes more significant as the scale of the drawing increases. Next, the effectiveness of the grouping (classification) management in dependence on the sizes of the figures (second embodiment) will be considered. Assuming that the number $m_1$ of the field blocks overlapping with the window before the grouping managing processing is equal to $m'_1$ while the number $m_1$ is equal to $m''_1$ after the grouping processing, the ratio of the times $T_2$ required for extracting the figure covering rectangle g overlapping with the window in the two-stage processing in both cases mentioned above is given by $(m''_1/m''_2)^{\frac{1}{2}}$. By way of example, when $m'_1 = 9$ and $m''_1 = 3$, the time $T_2$ required for extraction can be increased by a factor of about 2. Further, when the bucket division is made use of (third embodiment), such advantageous effect can be expected that the very number $m_1$ of the field blocks overlapping with the window can be decreased.

Figure 28:
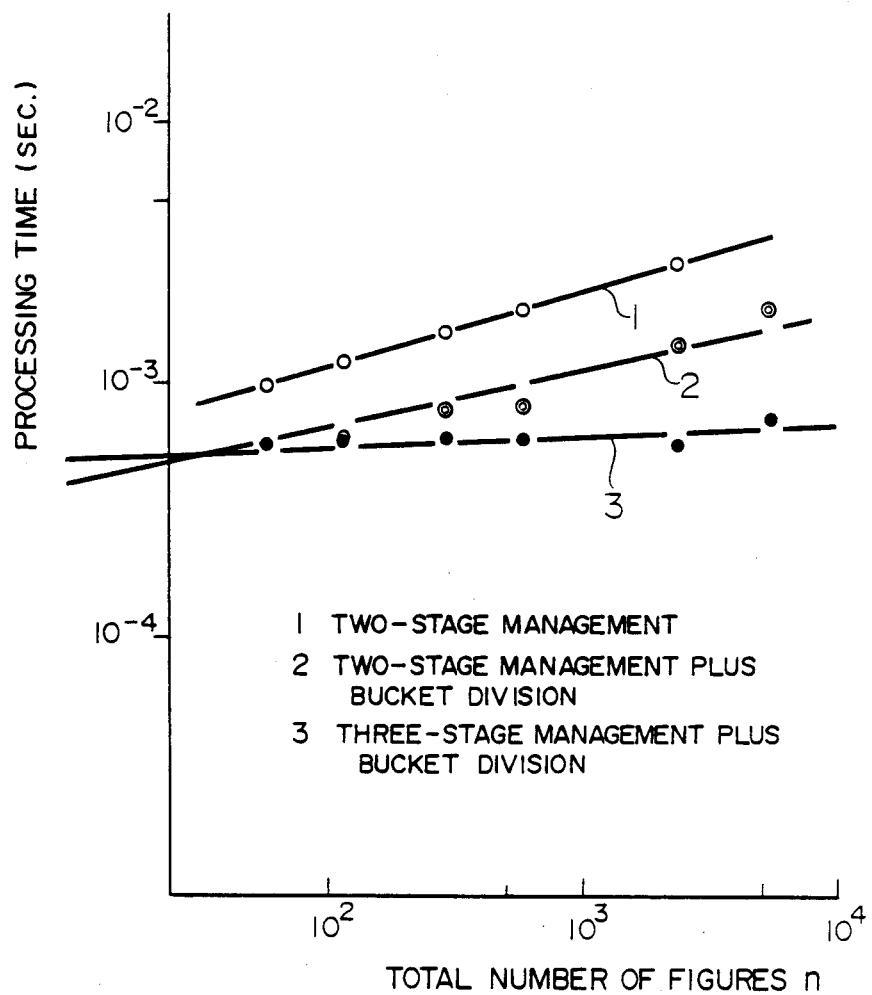
FIG. 28 is a view showing graphically a relation between the time required for extracting the figures of a drawing overlapping with a designated window on the basis of the information concerning a drawing processed according to the first, second and third embodiments of the invention and the number of all the figures included in the drawing.

FIG. 28 graphically illustrates the times required for extracting the figure covering rectangles overlapping with the window in the drawing information processing apparatuses according to the embodiments of the present invention. In FIG. 28, the total figure number n is taken along the abscissa with the time T (seconds) for the extraction processing is taken along the ordinate. A curve 1 represents characteristically the two-stage management processing, while curves 2 and 3 represent characteristically the two-stage management making use of the bucket division method and the three-stage management making use of the bucket division method, respectively. More specifically, FIG. 28 shows characteristically the time T (seconds) involved in executing a test program for extracting ten figures inclusive of those having eight apex from a drawing having n figures in total in the two-stage management (curve 1), two-stage management plus bucket division (curve 2) and the three-stage management plus bucket division (curve 3), respectively. The processing time T is equivalent to CPU time in "8 MIPS" computer. The characteristic curve 3 shows that the processing time T is substantially independent of the scales of the drawings handled by a practical program in the case of the three-stage management plus bucket division method to advantage. The effect that the processing time T is substantially independent of the scales of the drawings to be processed is never a mere aggregation of individual effects attributable to the three-stage managing method and the bucket division method, respectively, but provides far more useful contribution to the practical applications such as a processing system designed for dealing with large scale drawings.

Although the illustrative embodiments of the invention have been described in connection with two-dimensional figures, it should be understood that the teaching of the invention can equally be applied to the processing of three-dimensional figures.

We claim:

1. A method of processing information of a drawing illustrating a plurality of original figures included in a predetermined rectangular space defined by at least two dimensions for thereby storing data representing the respective original figures which are to be read out for determining any original figure at least a part of which is located within a given portion of the drawing, said method comprising:
    a first step of representing each of said original figures by a first-stage figure representing a selected one of a plurality of first rectangular areas which are defined by said at least two dimensions defining said rectangular space and covering completely said original figures, said selected one of the first rectangular areas being smaller in size than any other first rectangular area;
    a second step of preparing in a predetermined memory a first memory section including a plurality of memory regions and associated managing regions, and determining an upper limit of usable range of each of said memory regions as function of total number n of said figures included in said drawing;
    a third step of storing position data capable of defining the position of each of said first-stage figures within said drawing sequentially in one of the memory regions of said first memory section;
    a fourth step of storing the positional data of any one of said first-stage figures when storing of the position data of said one first stage figure at said third step will exceed said upper limit of the usable range of the one memory region, in a succeeding memory region of the same memory section;
    a fifth step of defining a second stage figure representing a selected one of second rectangular areas which are defined by said at least two dimensions defining said rectangular space and covering all the first-stage figures corresponding to the position data stored in each of the memory regions of said first memory section, said selected one of said second rectangular areas being smaller in size than any other second rectangular area; and
    a sixth step of storing position data capable of defining the position of said second-stage figure within said drawing in the managing region associated with the memory region of said first memory section in which said first-state figure covered by said second-stage figure is stored.

2. An apparatus for processing information of a drawing illustrating a plurality of original figures contained in a predetermined rectangular space defined by at least two dimensions for storing data representing the respective original figures to be read out for determining any original figure at least a part of which is located within a given portion of the drawing, said apparatus comprising:
    input means for externally inputting figure information containing figure data capable of defining positions and shapes of said original figures in said drawing and a total number n of said original figures included in said drawing;
    memory means having first memory section including a plurality of memory regions and associated managing regions;
    first means for determining a first-stage figure representing a selected one of first rectangular areas which are defined by the same dimensions as those defining said rectangular space and covering completely each of said original figures on the basis of said inputted figure data, said selected one of said first rectangular areas being smaller in size than any other first rectangular area and determining position data indicating the positions of said first-stage figures on said drawing;
    second means for establishing the upper limit of a usable range of each of said memory regions as a function of n;
    third means for storing the position data of said firststage figures sequentially into one of said memory regions, so long as the upper limit of the usable range of said one memory region is not exceeded, and storing, when the position data of any of the first-stage figures cannot be stored in said one memory region without exceeding its upper limit of the usable range, the position data of said one and succeeding ones of the first-stage figures into a next memory region succeeding to said one memory region; and
    fourth means for defining a second stage figure representing a selected one of second rectangular areas which are defined by the same dimensions as those defining said rectangular space and covering all the first stage figures corresponding to the position data stored in each of said memory regions of said first memory section, said selected one of the second rectangular areas being smaller in size than any other second rectangular area, determining position data indicating the position of said second-stage figure on said drawing and storing said position data in the managing region associated with the memory region.

3. A method of processing information of a drawing illustrating a plurality of original figures for storing data representing the respective original figures to be read out for determining any figure at least a part of which is viewed in a given rectangular window of the drawing, said method comprising the steps of:
    representing each of said original figures by a first-stage figure which is a selected one of first rectangles which cover completely the original figure, said selected one of said first rectangles being smaller in size than any other first rectangle;

preparing in a predetermined memory first and second memory sections each including a plurality of memory regions and associated managing regions and determining an upper limit of usable range of each of said memory regions as a function of total number n of said figures included in said drawing;

storing position data capable of defining the positions of said first-stage figures in said drawing sequentially in one of the memory regions of said first memory section;

storing the position data of any one of said first-stage figures when the position data of said one first-stage figure cannot be stored in said one memory region without exceeding its upper limit of the usable range, in a succeeding memory region of the same memory section;

defining a second-stage figure which is a selected one of second rectangles which cover all the first-stage figures of which the position data are stored in each of the memory regions of said first memory section, said selected one of said second rectangle being smaller in size than any other second rectangle;

storing position data defining a position of each of said second-stage figures in said drawing in the managing region associated with the memory region of said first memory section in which the position data of said first-stage figures covered by said second-stage figure are stored;

storing the position data defining the positions of said second-stage figures in said drawing sequentially in one of the memory regions of said second memory section;

storing when the position data of any one of said second stage figures can not be stored in said one memory region of said second memory without exceeding its upper limit of the usable range of said one memory region of said second memory section the data of said one and succeeding ones of said second stage figures sequentially, into a succeeding memory region of the same memory section;

defining a third-stage figure which is a selected one of third rectangles which cover all of said second-stage figures corresponding to the position data stored in each of the memory regions of said second memory section, said selected one of said third rectangles being smaller in size than any other third rectangle; and storing the position data defining a position of said third-stage figure in said drawing in the managing regions associated with the memory region of said second memory section in which the position data of said second-stage figures covered by said third-stage figure are stored.

4. A method of processing information of a drawing according to claim 3, further including steps of:

dividing said drawing in correspondence with said first and second stage figures into first and second buckets having same sizes and same shapes, respectively, of said first and second buckets being determined as a function of $n^{\frac{1}{2}}$ and $n^{\frac{1}{4}}$ respectively;

making each of said first stage figures belong to one of the first buckets resulting from said division in which a particular point of said each first stage figure is located;

allocating the memory regions of said first memory section to said first buckets, respectively;

storing said position data of each of said first stage figures in one of the memory regions of said first memory section allocated to one of said first blocks to which said each first stage figure belong, respectively;

making each of said second stage figures belong to one of said second buckets in which a particular point of said each second stage figure is located; and storing said position data of each of said second stage figures in one of the memory regions of said second memory section allocated to the second bucket to which said each second stage figure belongs, respectively.

5. An apparatus for processing information of a drawing illustrating a plurality of original figures for storing data representing the respective figure to be read out for determining any original figure at least a part of which is viewed in a given rectangular window of the drawing, said apparatus comprising:

input means for externally inputting figure information containing figure data defining the positions and shapes of said figures on said drawing and a global number n of said original figures included in said drawing;

memory means having first and second memory sections, each including a plurality of memory regions and associated managing regions;

first means for determining a first-stage figure which is a selected one of first rectangles which cover completely each of said original figures on the basis of said inputted figure data, said selected one of said first rectangles being smaller in size than any other first rectangle and determining position data indicating a position of said first-stage figure on said drawing;

second means for establishing an upper limit of a usable range of each of the memory regions of said first and second memory sections as a function of $n^{\frac{1}{2}}$;

third means for storing the position data of said firststage figures of the respective original sequentially into one of said memory regions of said first memory section, and storing, when the position data of any one of said first-stage figures cannot be stored in said one memory region without exceeding its upper limit of the usable range, the position data of said one and succeeding ones of said first stage figures sequentially into a succeeding one of said memory regions of said first memory section;

fourth means for determining a second-stage figure which is a selected one of second rectangles which cover completely all of said first stage figures corresponding to the position data stored in each of the memory regions of said first memory section, said selected one of said second rectangles being smaller in size than any other second rectangle and storing position data of the second-stage figure in the managing region associated with said each memory regions;

fifth means for storing the position data of said secondstage figures sequentially into one of said memory region of said second memory section, and storing, when the position data of any one of said second-stage figures cannot be stored in said one memory region without exceeding its upper limit of the usable range, the position data of said one and succeeding ones of said second-stage figures sequentially into a succeeding one of said emory regions of said second memory section; and sixth means for defining a third-stage figure which is a selected one of third rectangles which cover all the second-stage figures corresponding to the position data stored in each of the memory regions of said second memory section, said selected one of the third rectangles being smaller in size than any other third rectangle and storing said position data of said third-stage figure in the managing region associated with the memory region.

6. An apparatus for processing information of a drawing according to claim 5, further including:

seventh means for dividing said drawing into first and second buckets having same sizes and same shapes, respectively, in numbers of said first and second buckets being determined as function of $n^{\frac{3}{2}}$ and $n^{\frac{1}{2}}$, respectively, in correspondence to said first and second stage figures; and eighth means for determining for each of said first-stage figures one of said first buckets in which a particular point on each of said each first-stage figures is located and making said figure having said particular point thereon belong to said one first bucket;

wherein the memory regions of said first memory section are allocated to said first buckets, respectively, said position data of each of said first stage figures being stored in one of the memory regions of said first memory section allocated to said one first bucket to which said first stage figure associated with said position data belongs;

the memory regions of said second memory section being allocated to said second buckets, respectively, said position data of each of said second stage figures being stored in one of the memory regions of said second memory section allocated to the second bucket to which said each second stage figure belongs.

7. A method of processing information of a drawing illustrating a plurality of original figures contained in a predetermined rectangular space defined by at least two dimensions for thereby storing data representing the respective figures which are to be read out for determining any original figure at least a part of which is located within a given portion of the drawing, said method comprising:

a first step of representing each of the original figures by a first-stage figure representing a selected one of first rectangular areas which are defined by the same dimensions as those defining said rectangular space and covering completely the original figure, said selected one of said first rectangular areas being smaller in size than any other first rectangular area;

a second step of preparing in a predetermined memory first to (k−1)th memory sections each including a plurality of memory regions and associated meaning regions, where k is an integer larger than 2, each memory region having an upper limit of its usable range determined as a function of n1/k;

a third step of storing position data defining a position of each of 1-th stage figures, where i=1, 2, 3, . . . (k−1), within said drawing sequentially in one of the memory regions of the i=th memory section;

a fourth step of storing the position data of any one of the i-th stage figure cannot be stored in said one memory region at the third step without exceeding the upper limit of the usable range of said one memory region, in a succeeding memory region of the i-th memory section;

a fifth step of defining a (i+1)th stage figure representing a selected one of second rectangular areas which are defined by the same dimensions as those defining the rectangular space and covering all the i-th stage figures whose position data are stored in each of said memory regions of said i-th memory section, said selected one of said second rectangular area being smaller in size than any other second rectangular area; and a sixth step of storing position data defining a position of the (i+1)th stage figure within the drawing in the managing region of said i-th memory section associated with memory region in which the i-th stage figures covered by the (i+1)th stage figure are stored.

8. A method of processing information of a drawing according to claim 7, further including:

a step of classifying said original figures into predetermined plural groups in accordance with the sizes of said original figures; and a step of dividing each of said first to (k−1)th memory sections into a plurality of subsections in correspondence with said plural groups, and determining the upper limit of the usable range of memory region of each subsection as a function of the total number of the original figures classified to the corresponding group;

wherein said third to sixth steps are applied to the respective groups of the original figures, separately, so that the position data of said i-th stage figures associated with the original figures of any one group are stored in the memory regions of said subsection of said i-th memory section corresponding to said one group.

9. A method of processing information of a drawing according to claim 7, further including:

a step of classifying said original figures into predetermined plural groups in accordance with the features of said original figures; and a step of dividing each of said first to (k−1)th memory sections into a plurality of subsections in correspondence with said plural groups, and determining the upper limit of the usable range of memory region of each subsection as a function of the total number of the original figures classified to the corresponding group;

wherein said third to sixth steps are applied to the respective groups of the original figures, separately so that, the position data of said i-th stage figures associated with the original figures of any one group are stored in the memory regions of said subsection of said i-th memory corresponding to said one group.

10. A method of processing information of a drawing according to claim 7, further including:

a step of dividing said drawing in correspondence with said i-th stage figures (i-1, 2, . . . , k−1) into a number of buckets having a same size and a same shape determined as a function of n, k and i;

a step of making each of said i-th stage figures belong to one of the buckets in which a particular point on said figure is located; and a step of allocating the memory regions of said i-th memory section to said bucket, respectively;

wherein at said third steps, said position data of each of said i-th stage figures are stored in the memory region of said i-th memory section allocated to the bucket to which said i-th stage figure belongs.

11. A method of processing information of a drawing according to claim 10, wherein said drawing is divided into $n^{(k-1)/k}$, $n^{(k-2)/k}$, ..., $n^{1/k}$ buckets with respect to said first, second, ..., (k−1)th stage figures, respectively.

12. A method of processing information of a drawing according to claim 10, further including:
- a step of selecting one original figure from the original figures of which information has already been stored in said memory and determining one of the buckets into which the drawing is divided with respect to said i-th stage figures, in which one bucket (called as a current bucket) the i-th stage figure associated with said selected one original figure is located;
- a step of transforming said selected one original figure into a new figure differing from said selected one figure at least in the position or shape, determining the i-th stage figure for the new figure, and determining one bucket (called as post-transformation bucket) of said buckets divided with respect to said i-th stage figures, said one bucket (post-transformation bucket) covering the position of said i-th stage figure;
- a step of deciding whether or not said current bucket is same as said post-transformation bucket;
- a step of erasing the data of the i-th stage figure relating to said selected one original figure stored in the memory region of said i-th memory section, when said current bucket is same as said post-transformation bucket, and storing subsequently the data of the i-th stage figure relating to said new figure in said memory region; and
- a step of preparing a new memory region in said i-th memory section, when said current bucket differs from said post-transformation bucket, and storing the data of the i-th stage figure relating to said new figure in said new memory region while erasing the data of the i-th stage figure relating to said selected one original figure in said memory region.

13. An apparatus for processing information of a drawing illustrating a plurality of original figures contained in a predetermined rectangular space defined by at least two dimensions for thereby storing data representing the respective figures which are to be read out for determining any original figure at least a part of which is located within a given portion of the drawing, said apparatus comprising:
- input means for externally inputting figure information containing figure data defining positions and shapes of said individual original figures in said drawings included in the drawing;
- memory means having first to (k−1)th memory sections each including a plurality of memory regions and associated managing regions, where k is an integer larger than 2;
- first means for representing each of the original figures by a first-stage figure representing a selected one of first rectangular areas which are defined by the same dimensions as those defining said rectangular space and covering completely the original figure based on the inputted figure data, said selected one of said first rectangular areas being smaller in size than any other first rectangular area and determining position data indicating the position of said first-stage figure on said drawing;
- second means for establishing an upper limit of a usable range of each of said memory regions as a function of $n^{1/k}$;
- third means for storing position data defining respective positions of i-th stage figures, where i = 1, 2, 3, ... (k−1), within said drawing sequentially in one of the memory regions of the i-th memory section so long as the upper limit of the usable range of said one memory region is not exceeded;
- fourth means for storing the position data of any one of the i-th stage figure, when the position data of said one i-th stage figures cannot be stored in said one memory region without exceeding the upper limit of the usable range of said one memory region, in a succeeding memory region of the i-th memory section;
- fifth means for defining a (i+1)th stage figure representing a selected one of second rectangular areas which are defined by the same dimensions as those defining the rectangular space and covering all the i-th stage figures whose position data are stored in each of said memory regions of said i-th memory section, said selected one of said second rectangular areas being smaller in size than any other second rectangular area; and
- sixth means for storing position data defining a position of the (i+1)th stage figure within the drawing in the managing region of said i-th memory section associated with the memory region in which the i-th stage figures covered by the (i+1)th stage figure are stored.

14. An apparatus for processing information of a drawing according to claim 13, further including seventh means for classifying said original figures into predetermined plural groups in accordance with the sizes of said original figures,
- each of said first to (k−1)th memory sections having a plurality of subsections allocated to said plural groups, respectively,
- wherein said second means determines the upper limit of the usable range of memory region of each subsection as a function of the total number of the original figures classified to the corresponding group, the position data of said i-th stage figures associated with the respective groups of the original figures being stored in the memory regions of said subsections allocated to said groups, respectively.

15. An apparatus for processing information of a drawing according to claim 13, further including seventh means for classifying said original figures into predetermined plural groups in accordance with the features of said original figures,
- each of said first to (k−1)th memory sections having a plurality of subsections allocated to said plural groups, respectively;
- wherein said second means determines the upper limit of the usable range of memory region of each subsection as a function of the total number of the original figures classified to the corresponding group, the position data of said i-th stage figures associated with the respective groups of the original figures being stored in the memory regions of said subsections allocated to said groups, respectively.

16. An apparatus for processing information of a drawing according to claim 13, further including:

seventh means for dividing said drawing when said i-th stage figures (i-1, 2, ..., k−1) are to be processed into buckets having a same size and a same shape in a number determined as a function of n, k and i; and eighth means for determining one of the buckets in which a particular point on each of said i-th stage figures is located, and making the i-th stage figure belong to said one bucket;

wherein the memory regions of said i-th memory section are allocated to said buckets, respectively, while said position data of said i-th stage figures are stored in the memory regions of said i-th memory section allocated to the buckets to which the i-th stage figures belong, respectively.

17. An apparatus for processing information of a drawing according to claim 16, wherein said drawing is divided into $n^{(k-1)/k}$, $n^{(k-2)/k}$, ..., $n^{1/k}$ buckets, respectively, when said first, second, ..., (k−1)th stage figures are to be processed.

18. An apparatus for processing information of a drawing according to claim 16, further including:

ninth means for transforming one of the original figures whose information has already been stored to a new figure differing from said one original figure at least in the position or shape through said input means;

tenth means for determining a first one of the buckets in which said i-th stage figure associated with said selected one original figure is located, and determining a second one of the buckets divided for said i-th stage figures in which a second bucket of said i-th stage figure after said transformation is located;

eleventh means for deciding whether or not said first bucket is same as said second bucket; and twelfth means for erasing the data of the i-th stage figure relating to said selected one original figure stored in the memory region of said i-th memory section, when said first bucket is decided to be same as said second bucket, and storing subsequently the data of the i-th stage figure relating to said new figure in said memory region, while preparing a new memory region in said i-th memory section, when said first bucket differs from said second bucket, and storing the data of the i-th stage figure relating to said new figure in said new memory region with the data of the i-th stage figure relating to said selected one original figure being erased from said memory region.

\* \* \* \* \*